US006970909B2

(12) United States Patent
Schulzrinne

(10) Patent No.: US 6,970,909 B2
(45) Date of Patent: Nov. 29, 2005

(54) MULTI-PROTOCOL DATA COMMUNICATION SYSTEM SUPPORTING WIRELESS TELEPHONY AND CONTENT DELIVERY

(75) Inventor: Henning Schulzrinne, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 10/380,138
(22) PCT Filed: Oct. 11, 2001
(86) PCT No.: PCT/US01/31809

§ 371 (c)(1),
(2), (4) Date: Mar. 18, 2004

(87) PCT Pub. No.: WO02/31669

PCT Pub. Date: Apr. 18, 2002

(65) Prior Publication Data

US 2004/0148395 A1 Jul. 29, 2004

(51) Int. Cl.[7] .............................................. G06F 13/00
(52) U.S. Cl. ..................................................... 709/206
(58) Field of Search .......................... 340/7.21, 825.22; 370/389, 261; 709/200, 202, 203, 217, 227, 709/228, 229, 206; 379/900; 705/1, 14

(56) References Cited

U.S. PATENT DOCUMENTS 5,909,183 A * 6/1999 Borgstahl et al. ...... 340/825.22
6,011,579 A    1/2000 Newlin
6,034,621 A *  3/2000 Kaufman ................... 340/7.21
6,075,796 A    6/2000 Katseff et al.
6,125,113 A *  9/2000 Farris et al. ................ 370/389
6,434,143 B1   8/2002 Donovan
6,529,501 B1   3/2003 Zhao et al.
6,564,261 B1 * 5/2003 Gudjonsson et al. ....... 709/227
6,597,686 B1   7/2003 Smyk
6,690,663 B1   2/2004 Culver
6,763,020 B1   7/2004 Hon

OTHER PUBLICATIONS

Kelly Carroll, "Internet Boosts Unified Messaging: Wireless Carriers Turn to Web-Based Systems," Telephony Online, Apr. 24, 2000.

(Continued)

Primary Examiner—Robert B. Harrell
(74) Attorney, Agent, or Firm—Baker Botts L.L.P.

(57) ABSTRACT

A communication system in accordance with the present invention includes at least one network appliance device (3415) which is coupled to a network (3402). The network appliance device (3415) includes software for detecting incoming calls and initiating call sessions in accordance with a signaling protocol. The system further includes a wireless communication gateway (3410) coupled to the network (3402) for allowing the network appliance device (3415) to communicate in accordance with a wireless network protocol. The wireless communication gateway (3410) includes, or is coupled to, a communication proxy (3405) for translating messages between the signaling protocol and the wireless network protocol. In one exemplary embodiment the signaling protocol takes the form of the Session Initiation Protocol (SIP) and the wireless communication protocol takes the form of the Wireless Application Protocol (WAP).

20 Claims, 28 Drawing Sheets

OTHER PUBLICATIONS

"'Killer App' Is On The Loose: Unified Messaging Is A Key Service Enabled By The Next-Generation Network," Communication News, Jan. 2000.

Leonard Chong et al., "Towards a Unified Messaging Environment Over the Internet," Cybernetics and Systems, Sep. 1999.

Brian Quinton, "Microsoft, Sprint Offer Unified Messaging Product," Telephony Online, Jun. 14, 1999.

Richard Tarabour et al., "Manageable Messages," Telephony Online, Jun. 7, 1999.

Peter Wilson, "Packet Network Proof," Telephony Online, Mar. 22, 1999.

R. Babbage et al., "Internet Phone—Changing the Telephony Paradigm," Internet and Beyond 231 (eds. S. Sim & J. Davies, 1998).

Susan Biagi, "IP Networks Now and Forever: Carriers Must Bridge Packet, Circuit-Switched Networks," Telephony Online, Oct. 12, 1998.

\* cited by examiner

VOICE OVER IP ←——→
CIRCUIT-SWITCHED VOICE (POTS, ISDN) ←——→

| DSP Address | Length (hex) | (dec.) Usage |
|---|---|---|
| 0x1000 | 0xB000 | 128K ROM |
| 0x20000 | 0x10 | 16 LCD |
| 0x810000 | 0x20 | 32 Ethernet controller |
| 0x820000 | 0xf | 16 Keypad read, audio amplifier, control, hook control, system software reset |
| 0x87fe00 | 0x200 | 512 Internal RAM |
| 0x900000 | 0x8000 | 32K External Ram |

| DSP Address | Usage |
|---|---|
| 0x2000 | Command port for left-half of LCD |
| 0x20001 | Data port for left-half of LCD |
| 0x2002 | Command port for right-half of LCD |
| 0x2003 | Data port for right-half of LCD |

| Function Name | Function |
|---|---|
| *ARPinit()* | (Initialization Function)<br>ARP table initialization. |
| *c_int00()* | (Initialization Function)<br>Main program, initialize the stack pointer, external bus interface, and interrupt vector for TMS320C32. |
| *DMA_initialize()* | (Initialization Function)<br>Initialize the DMA0 and DMA1 channels. |
| *ENET_initialize()* | (Initialization Function)<br>Initialize the Ethernet controller. |
| *InitHardWare()* | (Initialization Function)<br>Initialize the Timer0, Timer1 and serial port. |
| *NameInit()* | (Initialization Function)<br>Initialize some SIP headers and SDP body. |
| *SerialPortInit()* | (Initialization Function)<br>Initialize the serial port. |
| *ARP_In_task()* | Parse ARP input packets |
| *ARPTimer_task()* | ARP timer, maintain the ARP table |
| *Call_task()* | Call processing |
| *Clock_task()* | A clock generates the hour, minute, and second |
| *Codec_task()* | A task to call encoding, decoding, ring generation, tone generation or memory loop. |
| *CreateSipCall()* | Create a SIP request packet for a call |
| *Ercv_task()* | Ethernet packet receiver and IP de-multiplexing. |

FIG. 13A

| Function Name | Function |
|---|---|
| *IP_Send_task()* | IP multiplexing and Ethernet packet sending. |
| *Key_task()* | Key pad monitor and input. |
| *RTP_In_task()* | RTP processing. |
| *Sendto()* | Send UDP packets to given IP address. |
| *Setting_task()* | Setting the E*Phone parameters. |
| *SIP_In_task()* | Accept SIP packets, and update call and SIP status. |
| *SIP_task()* | SIP status transition task |
| *Tone_task()* | Count the active and stop duration for tone or ring. |
| *UDP_In_task()* | Accept UDP packets |
| *ARP_Out()* | (High-level function)<br>ARP request program |
| *ClearScreen()* | (High-level function)<br>Clear all lines on the LCD |
| *CodecConfig()* | (High-level function)<br>Schedule a codec task according to the run mode parameter |
| *Disp()* | (High-level function)<br>Display a string on the LCD screen |
| *LCD()* | (High-level function)<br>Display a character on the LCD screen |
| *LCDClear()* | (High-level function)<br>Clear one line on the LCD screen |
| *LinearToUlaw()* | (High-level function)<br>Linear data to u-law data conversion |

FIG. 13B

| Function Name | Function |
|---|---|
| *Initialization()* | (High-level function)<br>Call initialization function and pre-schedule tasks |
| *RTP_para_init()* | (High-level function)<br>Generate the random time stamp and SSRC for a RTP session |
| *ScreenScroll()* | (High-level function)<br>Scroll the LCD screen for one line upward or downward |
| *SDPParse()* | (High-level function)<br>Parse SDP packets |
| *SIPParse()* | (High-level function)<br>Parse SIP packets |
| *SIP_Request()* | (High-level function)<br>Create SIP request messages |
| *SIP_Response()* | (High-level function)<br>Create SIP response messages |
| *SpeechDecode()* | (High-level function)<br>Speech decoding |
| *SpeechEncode()* | (High-level function)<br>Speech encoding |
| *ToneGenerate()* | (High-level function)<br>Generates dial tone, ring back tone, busy tone or alert tone. |

FIG. 13C

| Function |
|---|
| Function prototypes |
| Header file |
| Supervisor (kernel) |
| Trap Manager source file |

FIG. 13D

| Function Name | Function |
|---|---|
| *LCDWrite()* | (Low-level function) Write display data to LCD. |
| *RintEnable()* | (Low-level function) Enable the RINT0 for Rint0 ISR. |
| *RintDisable()* | (Low-level function) Disable the RINT0. |
| *SerialPortRst()* | (Low-level function) Reset the serial port. |
| *TimerEnable()* | (Low-level function) Enable the system timer TCLK1. |
| *TimerDisable()* | (Low-level function) Disable the system timer TCLK1. |

FIG. 13F

| Function Name | Function |
|---|---|
| c_int03() | Ethernet controller ISR. Triggered on INT3 of TMS320C32 by external interrupt from AM79C940. |
| c_int09() | System timer ISR. Triggered on TINT1 by internal timer1 of TMS320C32. |
| Rint0() | A/D and D/A ISR. Triggered on RINT0 by internal serial port interrupt of TMS320C32. |
| AmpControl() | (Low-level function) Control the speaker volume. |
| DMA1() | (Low-level function) Start the DMA1 channel. |
| DMA0_Release() | (Low-level function) Start the DMA0 channel. |
| DMA_int_set() | (Low-level function) Enable INT1 and INT2 for DMA0 and DMA1. |
| ENET_reset() | (Low-level function) Reset the Ethernet controller. |
| ENET_disable() | (Low-level function) Disable the Ethernet controller. |
| HandSet() | (Low-level function) Control the handset and hands-free switching. |
| HookState() | (Low-level function) Check the hook state. |
| Key() | (Low-level function) Key pad check and read. |
| KeyMap() | (Low-level function) Map the key binary input to ASCII format. |
| LCDCmd() | (Low-level function) LCD control command. |

FIG. 13E

```
struct ENetHeader {              /* Ethernet header structure */
    ETA Dest;                    /* Ethernet destination MAC address */
    ETA Source;                  /* Source MAC address */
    int Type;                    /* Ethernet packet type */
};

struct IPHeader {                /* IP header structure */
    int VI_ToS;                  /* IP version, header length, and service type */
    int Length;                  /* total length */
    int Identify;                /* identifier of the IP packet */
    int FragDff;                 /* flags and fragment offset */
    int TTL_Protocol;            /* time-to-live, and protocols */
    int ChkSum;                  /* checksum */
    IPA Source;                  /* source IP address */
    IPA Dest;                    /* destination IP address */
};

struct UDPHeader {               /* UDP header structure */
    int SPort;                   /* source port */
    int DPort;                   /* destination port */
    int Length;                  /* UDP message length */
    int ChkSum;                  /* UDP checksum */
};

struct EPACKET {                 /* Ethernet receive packet structure */
    struct ENetHeader Enh;       /* Ethernet header */
    struct IPHeader Iph;         /* IP header */
    struct UDPHeader Uh;         /* UDP header */
    int data[MaxUDPLength];      /* data field */
};
```

FIG. 17

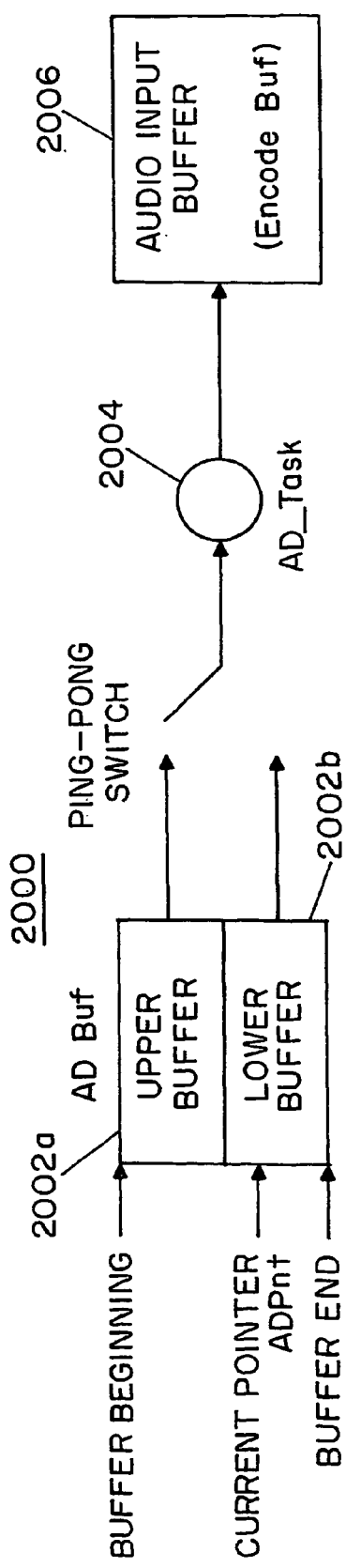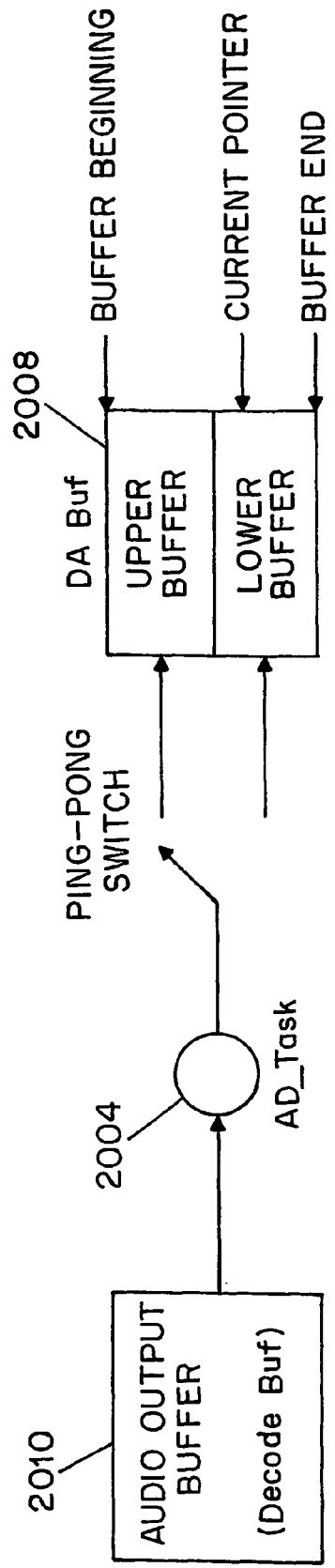
FIG. 20A
FIG. 20B

| Keys | ReturnValue |
|---|---|
| Digit keys | '0' ... '9' |
| Special keys | '*' and '#' |
| Enter key | 'E' |
| Hands Free | 'H' |
| Redial key | 'R' |
| Upward | 'U' |
| Downward | 'D' |

FIG. 22

```
struct FuncKey {
    WORD Enter;        Enter key
    WORD Redial;       Redial key
    WORD Up;           Up arrow key
    WORD Down;         Down arrow key
    WORD Digit;        digit keys or special key
    WORD Full;                 key buffer full
    WORD Enable;       when set, indicates key input is enabled
    WORD Touch;        any key was pressed
    WORD Alf;          an alphabetic key was pressed.
};
```

FIG. 23

| Port address | Read Write | Bit Value | bit7 | bit6 | bit5 | bit4 | bit3 | bit2 | bit1 | bit0 |
|---|---|---|---|---|---|---|---|---|---|---|
| 0x820001 | W | 0 | x$^5$ | x | x | x | Soft reset | Volume lock | ENET release | Hand free |
| 0x820001 | W | 1 | x | x | x | x | x | unlock | ENET reset | Hand set |
| 0x820001 | R | 0 | x | x | x | x | x | No key input | x | Hook off |
| 0x820001 | R | 1 | x | x | x | x | x | Key touched | x | Hook on |

FIG. 24

```
struct Message {          /* a structure for all messages in the SIP Phone */
    int ENetXmtST;        /* Ethernet transmission packet state */
    int ENetRcvST0;       /* Ethernet receiving packet state */
    int ENetRcvST1;       /* Ethernet receiving packet state */
    int ENetRcvST2;       /* Ethernet receiving packet state */
    int ENetRcvST3;       /* Ethernet receiving packet state */
    int RcvFlag;          /* The receiving speech data is available when SET */
    int ARPST;            /* reserved */
};
```

FIG. 25

```
typedef struct {
    int pt:7        /* payload type */
    int m:1         /* marker bit */
    int cc:4        /* CSRC count */
    int x:1         /* header extension flag */
    int p:1         /* padding flag */
    int version:2   /* protocol version */
    int seq         /* sequence number */
    int ts1         /* timestamp least significant 16 bits */
    int ts2         /* timestamp most significant 16 bits */
    int ssrc1       /* Synchronization source least significant 16 bits */
    int ssrc2       /* Synchronization source most significant 16 bits */
    int csrc[1]     /* optional CSRC list address */
} RTPHeader;
```

FIG. 26

```
struct ToneType {
        int ActiveTime;      The period for sound is active
        int ActiveCnt;       The counter for the sound during the active time
        int StopTime1;       First sound stop period
        int StopCnt1;        First sound stop counter
        int StopTime2;       Second sound stop period
        int StopCnt2;        Second sound stop counter
}
```

```
typedef struct {          /* string type used in message_t structure */
    char *s;              /* start of string */
    short len;            /* length of string */
} string;

typedef enum {            /* state transition structure */
    Initial,              /* SIP initial state, UAC or UAS */
    Proceeding,           /* proceeding of the request, UAS */
    Failure,              /* failure, UAS */
    Success,              /* success, UAS */
    Confirmed,            /* confirmed, UAS */
    Calling,              /* calling, UAC */
    CallProc,             /* call proceeding, UAC */
    Completed,            /* completed, UAC */
    Bye                   /* Bye state, UAC or UAS */
} Tstate;

typedef struct {          /* SIP message structure
    method_t method;      /* request: method; response: 0 */
    short status;         /* response: status value; request: 0 */
    string url;           /* request URL */
    string via;           /* via header */
    string callid;        /* Call-ID */
    string contact;       /* contact header */
    string from;          /* From address */
    string from_display;  /* From display name */
    string subject;       /* Subject */
    string to;            /* To address */
    string to_display;    /* To display name */
    string ts;            /* timestamp */
    string reason;        /* response reason phrase */
    content_t contenttype;/* contact type header */
    int contentlength;    /* contact length */
    unsigned cseq;        /* sequence number */
    string body;          /* SDP body */
    sdp_t sdp;            /* session description */
} message_t;

typedef struct {          /* call structure */
    int flag;             /* SET for effective, RESET for clear */
    int ua_state;         /* Not current call:0; UAC:1; UAS:2 */
    int status;           /* current response status */
    message_t m;          /* SIP message */
    char * udp;           /* receive SIP packets pointer */
    char * local;         /* UAC request packet pointer */
    sockaddr peer;        /* peer host IP address */
    sdp_t sdp;            /* sdp backup */
    Tstate state;         /* SIP transition state */
    int t1;               /* T1 timer */
    int t2;               /* T2 timer */
} call;
```

FIG. 29

| Message recieved | SIP_Status |
|---|---|
| 100 | SIP_Trying |
| 18x | SIP_Ring |
| 200 | SIP_Connected |
| 3xx | SIP_Redirect |
| 4xx, 5xx | SIP_Refused |
| 6xx | SIP_Busy |

MULTI-PROTOCOL DATA COMMUNICATION SYSTEM SUPPORTING WIRELESS TELEPHONY AND CONTENT DELIVERY

FIELD OF THE INVENTION

The present invention relates in general to the field of Internet and intranet telephony and more particularly relates to a network telecommunications appliance and system supporting both wired and wireless network telephony services.

BACKGROUND OF THE INVENTION

The Internet has evolved from a convenient additional means of communications to an essential communication tool. In this regard, a growing segment of the Internet relates to Internet telephony which provides a number of advantages over conventional circuit-switched network controlled by a separate signaling network. For one thing, parties are allowed to more easily select and use encoding and other data compression techniques that are most appropriate for their quality needs. Parties may, for example, decide that for international calls, they would trade lower cost for full toll quality, while a reporter calling in her story to a radio station may go for full FM quality with little regard for price. Even without quality degradation, 5.3 kb/s (G.723.1) to 8 kb/s (G.729) are sufficient to support close to toll quality as opposed to 64 kb/s for conventional landline telephone networks. This flexibility also has the advantage that during severe network overload, e.g., after a natural catastrophe, telephone customers can still communicate at about 3 kb/s, thus increasing network capacity twenty-fold.

Along with the growth of Internet telephony, there has been a growth in wireless telephony and wireless internet access. Such technologies have liberated millions of users by providing voice and data communications capabilities which are no longer tethered to the office desktop or home. These services have evolved from simple voice telephone connections, to messaging services, pushed content, wireless internet access and the like. Such services are known as second generation (2G), extended second generation (2.5G) and third generation (3G) wireless services, depending on the nature and sophistication of the service being offered. As wireless technologies evolve, various standards have been proposed for such devices.

One such protocol is the Wireless Applications Protocol (WAP) which is an open specification that offers a standard method to access Internet based content and services from wireless devices, such as mobile phones and PDAs (Personal Digital Assistants). The WAP model attempts to provides an interface which is similar to the traditional desktop Internet but formats content in a way that is suitable for the smaller and more limited displays generally available in portable devices. Portable WAP devices generally include micro-browser software which provides for content display and network navigation functionality. To perform this functionality, WAP content is written in a markup language called WML (Wireless Markup Language). An extension of WML, WMLScript, further enables client side intelligence. The WAP protocol is intended to be both network and operating system independent.

A feature of current wireless telephony systems is the provision for exchanging short text messages. For example, the Short Message Standard (SMS) is an addition to the GSM Standard that enables text messages of up to 160 characters on GSM networks and 190 characters on some other networks to be sent between mobile phones. SMS has been gaining popularity because of its low cost and quick message transfer. In addition to messaging between mobile phones, SMS can be incorporated into applications to alert users of events, such as a new email arriving or a stock share price movement. SMS messages are transferred between mobile phones via a Short Message Service Center (SMSC). The SMSC is software that resides in the operators network and manages the processes including queuing the messages, billing the sender and returning receipts if necessary.

In addition, Bluetooth is an open standard for two-way, short-wave radio communications between different devices, such as mobile phones, palmtops, portable PCs and printers. The Bluetooth protocol enables information between such devices to be synchronized. For example, diary information held on a PDA can be updated automatically when within range of a Bluetooth-enabled PC.

While there are numerous protocols for various wireless features, there remains a need to integrate such protocols in a network telephony appliance or system which can readily integrate the features of the Internet with those features of conventional and wireless telephony systems.

SUMMARY OF THE INVENTION

A communication system in accordance with the present invention includes at least one network appliance device which is coupled to a network. The network appliance device includes software for detecting incoming calls and initiating call sessions in accordance with a signaling protocol. The system further includes a wireless communication gateway coupled to the network for allowing the network appliance device to communicate in accordance with a wireless network protocol. The wireless communication gateway includes, or is coupled to, a communication proxy for translating messages between the signaling protocol and the wireless network protocol.

In one embodiment, the signaling protocol takes the form of the Session Initiation Protocol (SIP) and the wireless network protocol takes the form of the WAP protocol. Of course, other wireless network protocols can be employed, such as those used to enable 2G, 2.5G and 3G wireless telephony services.

The system can further include a signaling server, such as a SIP proxy server. The SIP proxy server generally operates as an intermediary between the individual network appliances and the communication gateway.

Also in accordance with the present invention is a method of communicating with a network appliance device in a network. The method includes operating a network appliance to detect incoming calls and initiate call sessions in accordance with a first protocol. The method further includes translating messages between the first protocol and a second protocol, using a communication proxy, to allow the network appliance device to communicate in accordance with a second protocol. Generally, the first protocol is a signaling protocol, such as SIP and the second protocol is a wireless communications protocol, such as WAP.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIGS. 13A, 13B, 13C, 13D, 13E, and 13F are tables illustrating exemplary task definitions for software operations of a preferred method of operating the Packet data network telephone in accordance with the hardware and software architectures of FIGS. 4 and 11;

FIG. 17 is a list of exemplary Ethernet transmit data structures according to the software architecture of FIG. 11;

FIGS. 20A and 20B show the A/D and D/A "ping-pong" buffer scheme used by the software of the present network telephony appliance;

FIG. 22 is chart defining the key pad values for the preferred embodiment of the Packet data network telephone of FIG. 5;

FIG. 23 is a data structure illustrating key state definitions for the preferred embodiment of the present network telephony appliance of FIG. 5;

FIG. 24 is a mapping of the I/O parallel port of the network telephony appliance of FIG. 5;

FIG. 25 is a data structure defining the Ethernet controller states of the network telephony appliance of FIG. 5;

FIG. 26 is an exemplary RTP header structure for RTP packet processing used in the network telephony appliance network telephony appliance of FIG. 5;

FIG. 29 is a list of data structures used for processing the SIP_task requests or responses in accordance with the network telephony appliance of FIG. 5;

DETAILED DESCRIPTION OF THE INVENTION

Figure 1:
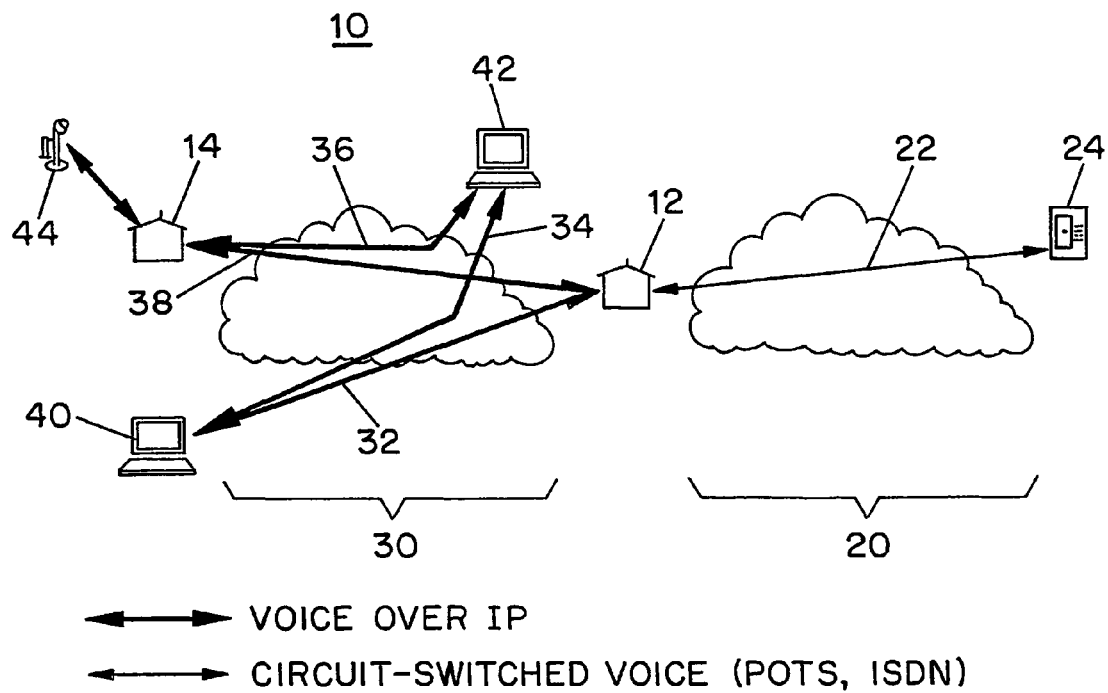
FIG. 1 is an illustrative diagram of a telecommunications system featuring a conventional circuit-switched voice network operatively coupled to a voice packet network.

FIG. 1 is a block diagram illustrating a telecommunications system having conventional telephony and packet telephony components. As shown in FIG. 1, the system includes a circuit-switched voice network 20 coupled to a packet network 30 via a first gateway 12. The figure shows at least three possible interactions between Internet telephony services and a conventional "plain old telephony service"(POTS) system: "end-to-end" packet delivery; "tail-end hop off" delivery; and local packet delivery. With "end-to-end" packet delivery, end systems such as network computers, dedicated Internet phones or personal computers (PCs) are used to packetize audio and deliver audio packets to one or more similar end systems for playback. With "tail-end hop off" delivery, packet networks are used for long-haul voice transmission, while standard circuit-switched voice circuits are used for connecting customer premise equipment (CPE), i.e., standard analog telephones, to the packet telephony gateways. "Tail-end hop off" can be used both for individual voice circuits as well as for PBX interconnects, and allows for the bypassing of conventional long-distance services as well as the interconnection of POTS equipment to packet-based audio end systems. With local packet delivery, voice data is generated by packet audio end systems, but is carried as circuit-switched voice over leased or public facilities.

Figure 2:
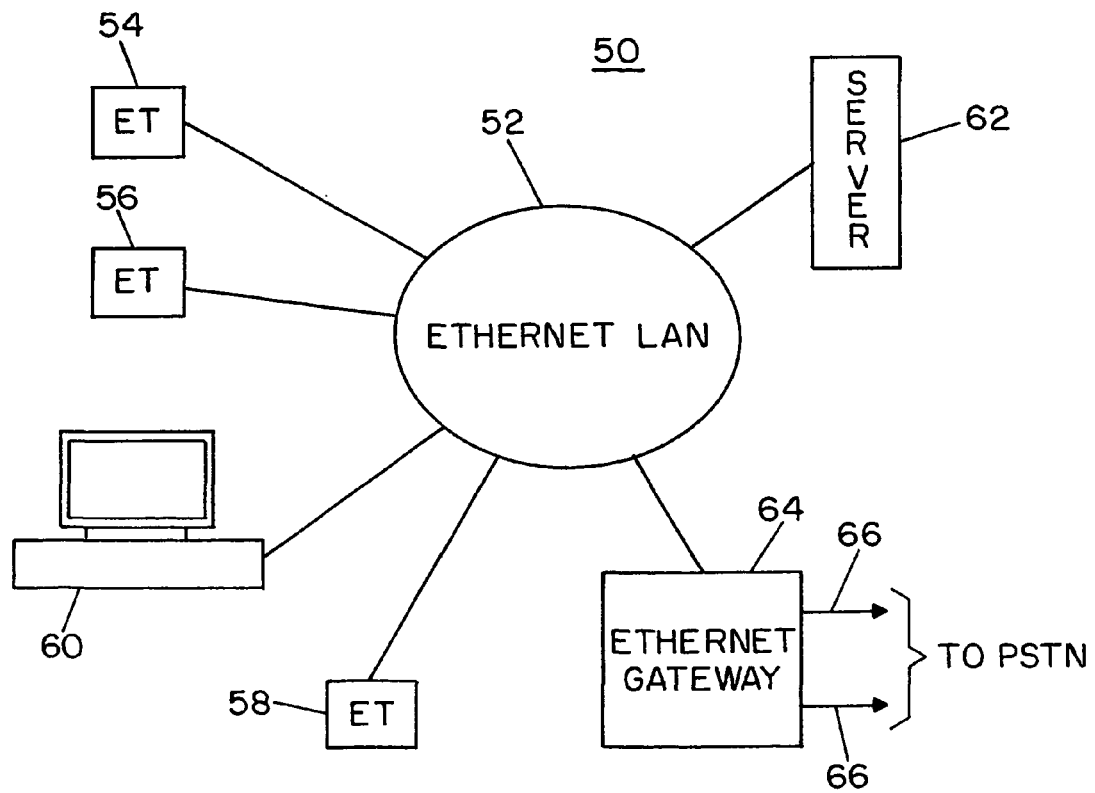
FIG. 2 is a block diagram of a packet data network telephone system.

FIG. 2 illustrates an embodiment of a packet data network telephone system 50 according to the present invention. The packet data network telephone system includes: an Ethernet LAN 52, Ethernet phones 54, 56, and 58, a workstation 60, a server 62 and an Ethernet gateway 64. The Ethernet phones are network devices, which can take the form of stand alone devices, such as a network appliance, or a personal computer system with audio input and output peripherals and operating under the control of an appropriate computer program. With such an packet data network approach, voice data traffic is packetized proximate the end user. The packet data network telephony system of FIG. 2, for example, can include several dozen homes, offices or apartments that are connected to a plurality of Ethernet gateways (only one shown in FIG. 2), each of which is located within the CAT-3S cabling distance limit of 328 feet from the network termination unit. The gateways can, in turn, connect through optical fiber to the neighborhood switch (not shown), or connect directly to the Public Switched Telephone Network (PSTN) via lines 66 as shown in FIG. 2. This architecture has the advantage that a mix of low-bandwidth and high-bandwidth customers can be accommodated without running additional wires. Since switch costs are dominated by interface counts rather than bandwidth, this mechanism offers much higher per-user bandwidth (particularly peak bandwidth), yet switching costs are similar to today's telephone networks.

In the architecture of FIG. 2, each network device includes a network address and each device can directly access every other network device via the network address. While a specialized server, such as a proxy server or redirect server, may be desirable to implement certain features, it is not required to establish a call session, i.e., point to point data communications between two or more network devices.

The use of a packet data network LAN 52 is advantageous in that it is a relatively inexpensive solution where conventional PC interfaces and network hardware can be used. The Packet data network LAN 52 can be operated over a variety of media and allows for the easy addition of more devices on a multiple-access LAN. Gateway 64 can be a single DSP that acts as a simple packet voice module and that implements DTMF recognition for user-to-network signaling.

Figures 3, 6:
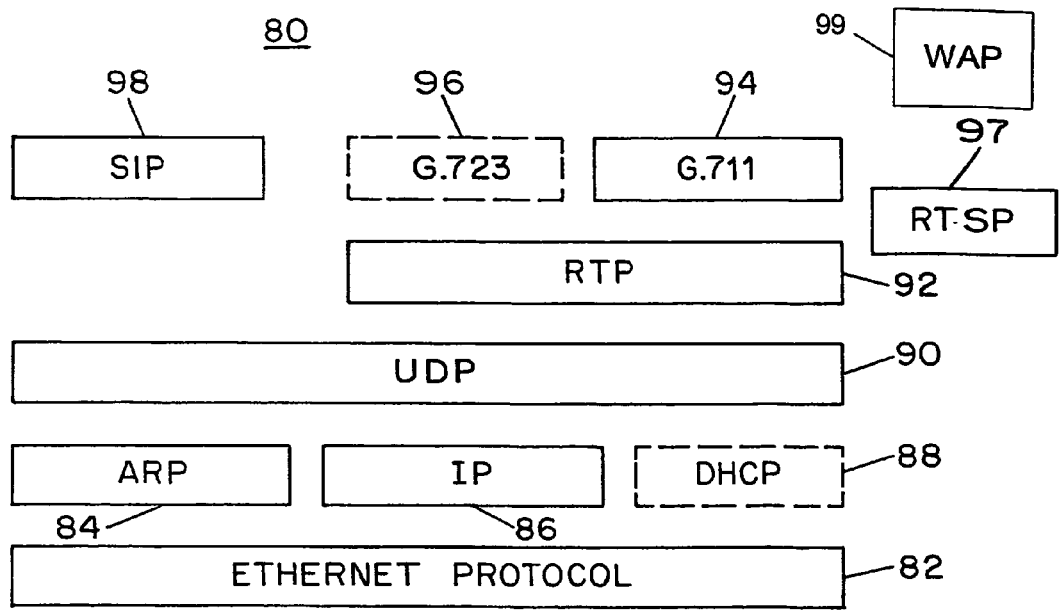
FIG. 3 is a diagram showing a protocol stack for telephony devices operating on the packet data network telephone system of FIG. 2.
FIG. 6 is an exemplary memory map for the DSP of the network telephony appliance of FIG. 5.

FIG. 3 is a block diagram which illustrates a packet data network protocol stack diagram for providing Internet telephony and other continuous-media ("streaming media") services such as "Internet radio" and "Internet TV." As known and understood by those skilled in the art, a "protocol" is generally a set of rules for communicating between computers. As such, protocols govern format, timing, sequencing, and error control. The term "stack" refers to the actual software that processes the protocols and thus allows the use of a specific set or sets of protocols. The diagram shown in FIG. 3 illustrates a layered hierarchy among the various protocols used.

The protocol stack 80 of FIG. 3 incorporates a number of layered protocols including: a base protocol 82 for providing basic Ethernet message format and timing information; an Address Resolution Protocol (ARP) 84 for interfacing with the base protocol 82 and for translating IP addresses into Media Access Control (MAC) addresses; an Internet Protocol (IP) network layer 86 for interfacing with the base protocol 82; an optional Dynamic Host Configuration Protocol (DHCP) 88 for interfacing with the base protocol 82; and a User Datagram Protocol (UDP) 90 for interfacing with the ARP 84, IP 86 and DHCP 88 protocols and for real-time transport of application data and controls. The protocol stack 80 further includes the following application-specific protocols for coding speech information: a Real-Time Transport Protocol (RTP) protocol 92 for real-time audio data transport, wherein the RTP protocol 92 generally interfaces with the UDP 90 and modulation, speech codec and control applications 94, 96 and 98, respectively. The application protocols 94 and 96 can take several forms, such as the G.711 pulse code modulation and the G.723 speech codec protocols, respectively. In addition, the Real Time Streaming Protocol (RTSP) layer 97 can be included to provide enhanced performance in streaming media applications. Control protocol 98 is used for session initiation and signaling and preferably takes the form the of the Session Initiation Protocol (SIP). The protocol stack can further include a layer for providing wireless functionality, such as a wireless protocol layer 99, for receiving and processing data conforming to a wireless protocol, such as the WAP data protocol. Of course, other wireless protocols, such as Bluetooth, can be used as well.

As shown in FIG. 3, RTP is a protocol for transporting real-time data across the Internet. See H. Schulzrinne, S. Casner, R. Frederick and V. Jacobson, "RTP: A Transport Protocol for Real-Time Applications," Request for Comments (Proposed Standard, RFC 1889, Internet Engineering Task Force (January 1996) which is hereby incorporated by reference in its entirety. RTP is a "thin" protocol providing support for applications with real-time properties, including timing reconstruction, loss detection, security and content identification. In addition, RTP provides support for real-time conferencing for large groups within an intranet, including source identification and support for gateways, such as for audio and video bridges, and multicast-to-unicast translators. RTP offers quality-of-service feedback from receivers to the multicast group as well as support for the synchronization of different media streams.

In FIG. 3, the combined stack of the IP, UDP and RTP protocols 88, 90 and 92 add 40 bytes to every packet for low-speed links and highly compressed audio, and 20 bytes for 20 ms of 8 kb/sec. audio. Thus, header compression is desirable.

As noted above, the protocol stack 80 of FIG. 3 preferably employs the Session Initiation Protocol (SIP) for establishing multimedia exchanges with one or more parties. Instead of using telephone numbers, SIP uses addresses in the form user@ domain or user@ host. This address, for example, can be identical to a person's e-mail address.

SIP provides the standard PBX or CLASS functionality, such as call forwarding, call waiting, caller M, call transfer, "camp-on," "call park," and "call pickup." "Camp-on" allows an attendant-originated or extended call to a busy single-line voice station to automatically wait at the called station until it becomes free while the attendant is free to handle other calls. "Call park" allows a user to put a call on hold and then retrieve the call from another station within the system. "Call pickup" allows stations to answer calls to other extension numbers within a user specified call pickup group. Many of these features actually require no signaling support at all, but can be implemented by end system software. SIP is designed as a variant of HTTP/1.1, which allows easy reuse of HTTP security and authentication, content labeling and payment negotiation features.

SIP further employs a calendar-based call handler. The call-processing software accesses a user's personal appointment calendar and answers the phone accordingly. The user can define categories of callers and preset, based on the calendar entry, whether and where their calls are forwarded. The information released to the caller if calls are not forwarded may range, for example, from "is currently not available" to "John Smith is in a meeting until 3 p.m. in Room 5621 with Jane Doe," depending upon the caller's identity. The call handler can also be integrated with the call processing language (CPL), which is a state-based scripting language that allows a user to construct voice-mail systems or automatic call handling systems in a few lines of code.

The call handler also manages the translation between ISDN calls and Internet telephony calls.

Figure 4:
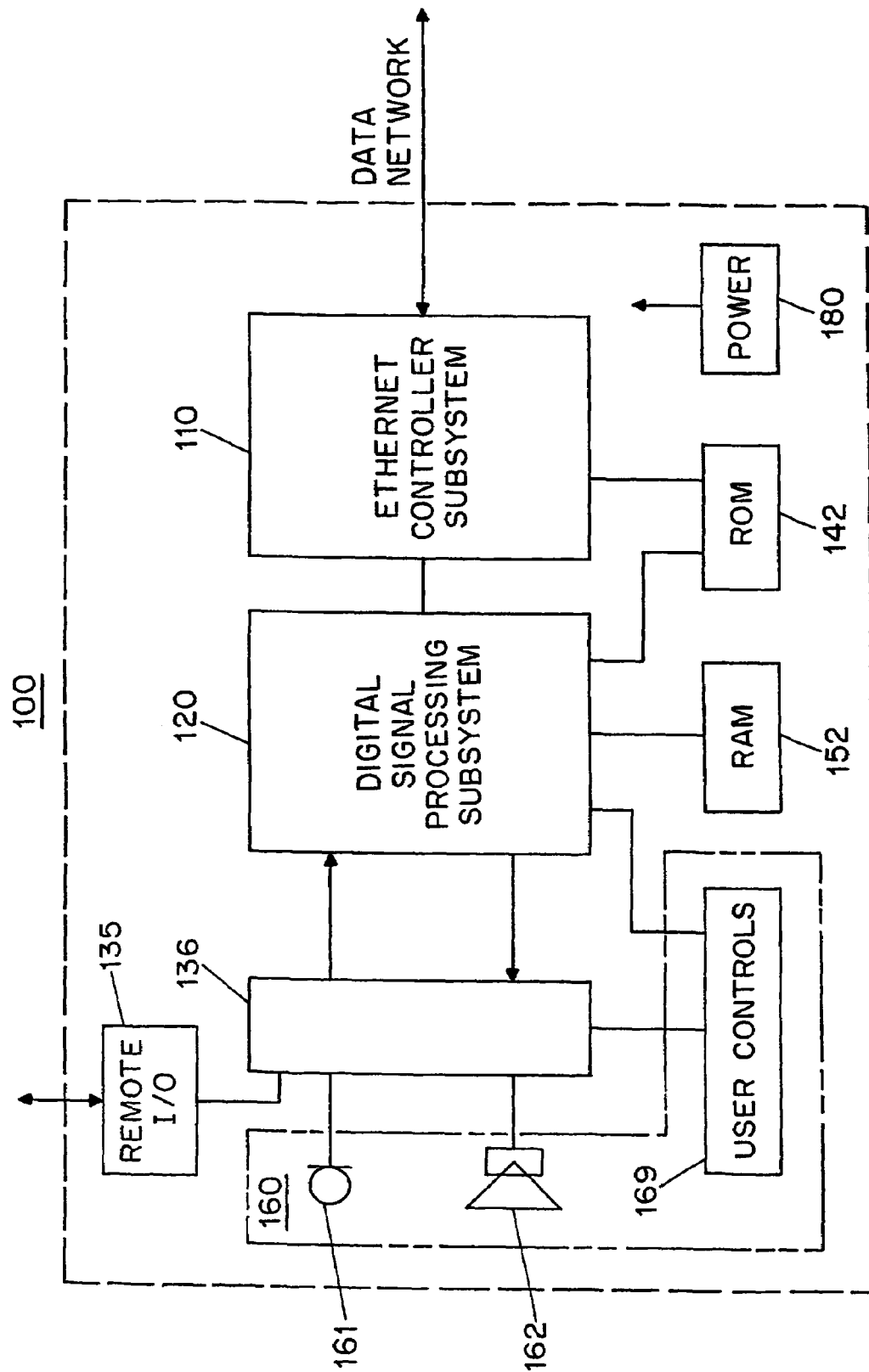
FIG. 4 is a block diagram of a preferred hardware architecture of a network telephony appliance in accordance with the present invention.

FIG. 4 is a high-level hardware block diagram showing an embodiment of a packet data network telephone, or network appliance 100. As will become apparent throughout this disclosure, the device 100 is a relatively low cost interface product to place voice and data onto a packet data network, such as Ethernet LAN's, intranets and the Internet. Therefore, the device 100 will generally be referred to as a network appliance to reflect the broad applicability of this stand alone device.

The network appliance 100 provides audio and video communications across a local area network (LAN), Internet or other Ethernet network, and generally includes: a network (e.g., Ethernet) controller subsystem 110; a digital signal processing subsystem 120; a signal conversion subsystem 130; and a user interface subsystem 160 coupled to both the signal conversion subsystem 130 and the digital signal processing subsystem 120. The telephone 100 further includes a power supply, ROM 142 and RAM 152. The user interface subsystem may include a speaker 161, a microphone 162 and other user controls 169 as discussed below and with reference to FIG. 5. Interface circuitry 135 for data acquisition and control functions can also be coupled to the signal conversion subsystem 130. Alternatively, such I/O circuitry can be directly coupled to DSP 120.

The network controller subsystem 110 is interposed between the DSP 120 and the external data network and as such provides and receives data packets to and from the data (Ethernet) network. The Ethernet controller subsystem 110 also instructs the digital processing subsystem 120 to accept data received from or to provide data to the Ethernet network. In addition, the network controller subsystem can act as an initial gatekeeper by rejecting and discarding corrupted or unwanted data packets received from the Ethernet network.

Figure 5:
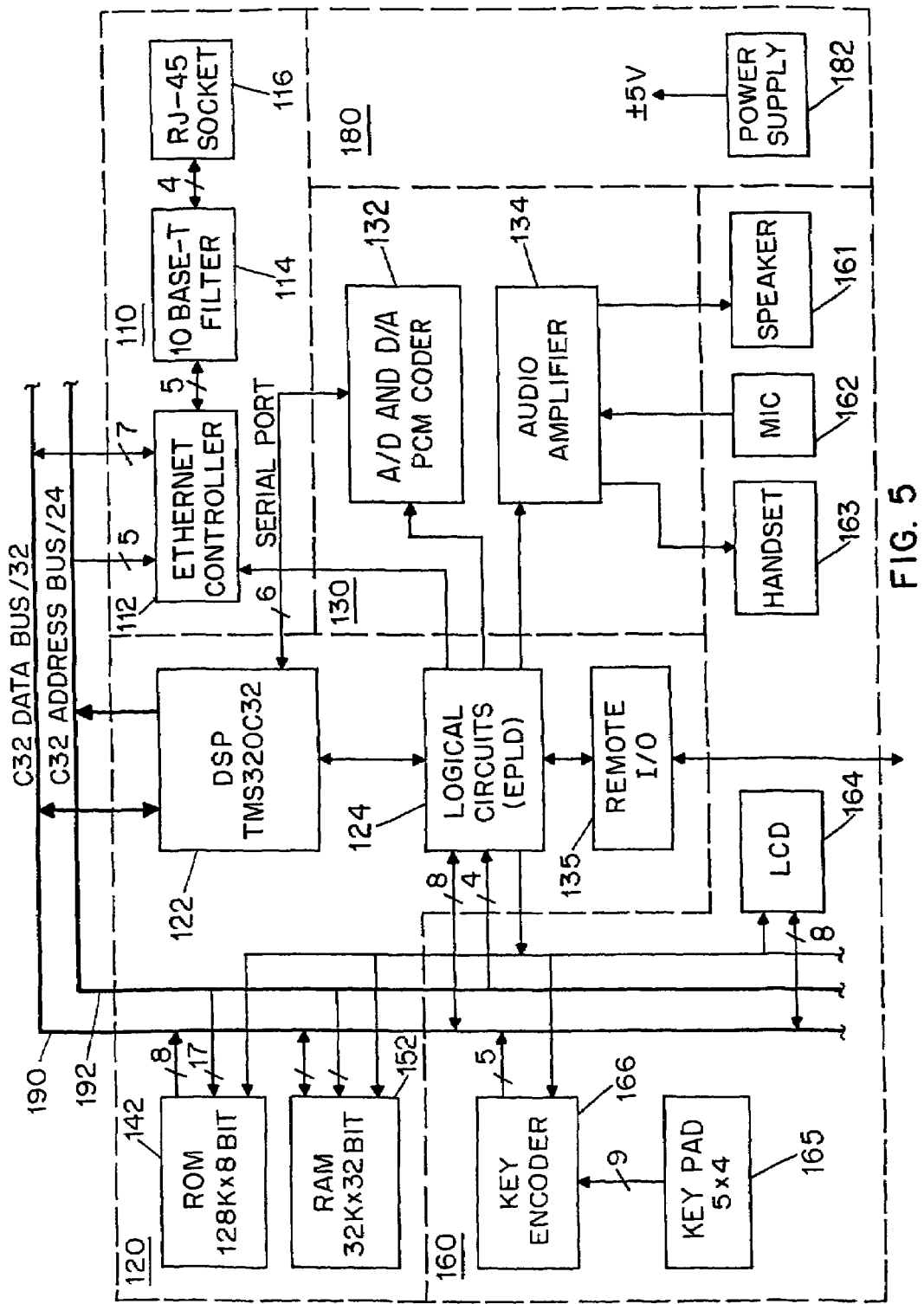
FIG. 5 is a block diagram further illustrating the network telephony appliance of FIG. 4.

FIG. 5 is a block diagram which illustrates the present network appliance in further detail. As shown in FIG. 5, a preferred embodiment of the network controller subsystem 110 includes an Ethernet controller 112, a service filter 114 (10Base-T transformer) and at least one RJ-45 socket 116. Among other things, the network controller subsystem 110 performs the following functions: interfacing the network appliance to the Ethernet network; sending and receiving Ethernet packets; informing the DSP subsystem 120 to accept the data when the data is available from the Ethernet; receiving the packets from the DSP subsystem 120 and sending same to the Ethernet; and rejecting and discarding unwanted packets from the Ethernet.

As shown in FIG. 5, the Ethernet Controller 112 can take the form of the AM79C940 Media Access Controller for Ethernet (MACE) available from Advanced Micro Device (AMD). The MACE device is a slave register based peripheral. All transfers to and from the system are performed using simple memory or I/O read and write commands. In conjunction with a user defined DMA engine, the MACE chip provides an IEEE 802.3 interface tailored to a specific application.

Individual transmit and receive FIFOs decrease system latency and support the following features: automatic retransmission with no FIFO reload; automatic receive stripping and transmit padding; automatic runt packet rejection; automatic deletion of collision frames; direct FIFO read/write access for simple interface to DMA controllers or I/O processors; arbitrary byte alignment and little/big/medium memory interface supported; and 5 MHZ–25 MHZ system clock speed.

Referring again to FIG. 5, the digital signal processing subsystem 120 includes a digital signal processor (DSP) 122 and related logical circuits, which include a read-only memory (ROM) 142, a random access memory (RAM) 52, and an erasable programmable logic device (EPLD) 124. The digital signal processing subsystem 120 provides the following functions: digital signal processing, such as speech compression; call progress tone generation, and ring signal generation; general "glue" logic to interconnect DSP, memory and I/O devices; network protocol processing; call flow control and finite-state-machine implementation; keypad activity detection and decoding; and display control.

As shown in FIG. 5, the DSP 122 used in the network appliance can be any suitable commercially available DSP, such as Texas Instruments' TMS320C32. The TMS320C32 DSP has the following features: parallel multiply and arithmetic logic unit (ALU) operations on integer or floating-point data in a single cycle; general-purpose register file; program cache; dedicated auxiliary register arithmetic units (ARAU); internal dual-access memories (512 double words); two direct memory access (DMA) channels; one serial port; two timers; one external memory port; and a multiple-interrupt structure. Of course, other DSP products having similar or enhanced features can also be used.

In addition, the TMS320C32 DSP includes four external interrupts and six internal interrupt resources. The external interrupt can be triggered directly by the external pins. The internal interrupt can be triggered by programming the individual peripherals, such as serial port, DMA controller, and timers. In addition, all these interrupt sources can be programmed as the DMA channel interrupt via CPU/DMA enable register, IE. The TMS320C32 DSP also includes a flexible boot loader which enables the main control program for the network appliance automatically loaded from one of three different external memory spaces or the serial port, whichever is appropriate as determined by the activity of the external interrupts of INT0 to INT3 when the DSP 122 is initialized, such as when the device is powered on.

The DSP 122 is generally configured to include the following resource assignments. External interrupts include: INT0: "System boot from 0x1000" indication. When the system is powered on and INT0 is active, the DSP will boot the program from external memory space 0x1000; INT1: DMA0 external interrupt signal, used for receiving packets from the network controller 112; INT2: DMA1 external interrupt signal, used for sending packets to the network controller 112; INT3: AM79C940 packet state and error message interrupt. A sample DSP memory map for use in an embodiment of the present network appliance is shown in FIG. 6.

Referring again to FIG. 5, the present network appliance has the user interface subsystem 160 which includes: a key encoder 166, a liquid crystal display (LCD) 164 and a hand set 163, which includes a keypad 165, a microphone 162 and a speaker 161. The user interface subsystem 160 components allow user interaction with the network appliance by providing the following functions: user interface for input (keypad) and output (LCD); voice interface; ring alert output through speaker; and handset or hands-free (microphone and speaker) communication alternative. Through this interface 160 user commands are entered and audio is sent and received to the user. The LCD 164 and keypad 165 can cooperate to form a limited graphical user interface (GUI) for displaying and manipulating content on the display and taking actions in response thereto.

In addition, the LCD can have buttons adjacent to the display, such as on the side and below. The function of these buttons can operate as "soft keys" the function of which depends on the current state of the system. For example, when not answering calls, the display can shown a quick dial list and the time of day. In addition, after calls have gone unanswered or been forwarded to voice mail, the display shows can show a list of received calls. During the call, any other incoming calls are displayed, allowing the subscriber to switch between calls or bridge the call into the existing call.

Alternatively, the user interface 160 of the present network appliance 100 can be configured with a small touch screen (not shown) to replace or supplement the LCD display and buttons. The touch screen, which graphically displays available functions and operations and responds to user contact on the display, provides an enhanced user interface, such as for the entry of alphanumeric network addresses and other telephony operations.

FIG. 5 also shows the signal processing system 130, which includes PCM encoder and decoder that performs analog-to-digital (A/D) and digital-to-analog (D/A) conversion, and an audio amplifier 134 coupled to the handset and the corresponding speaker 161 and microphone 162. Also provided is a power supply for providing positive and negative 5V voltage levels from a single AC or DC power supply adapter ("wall wart"). In the preferred embodiment of FIG. 5, negative voltage levels are required by the LCD 164 and the PCM codec 132.

Figure 7:
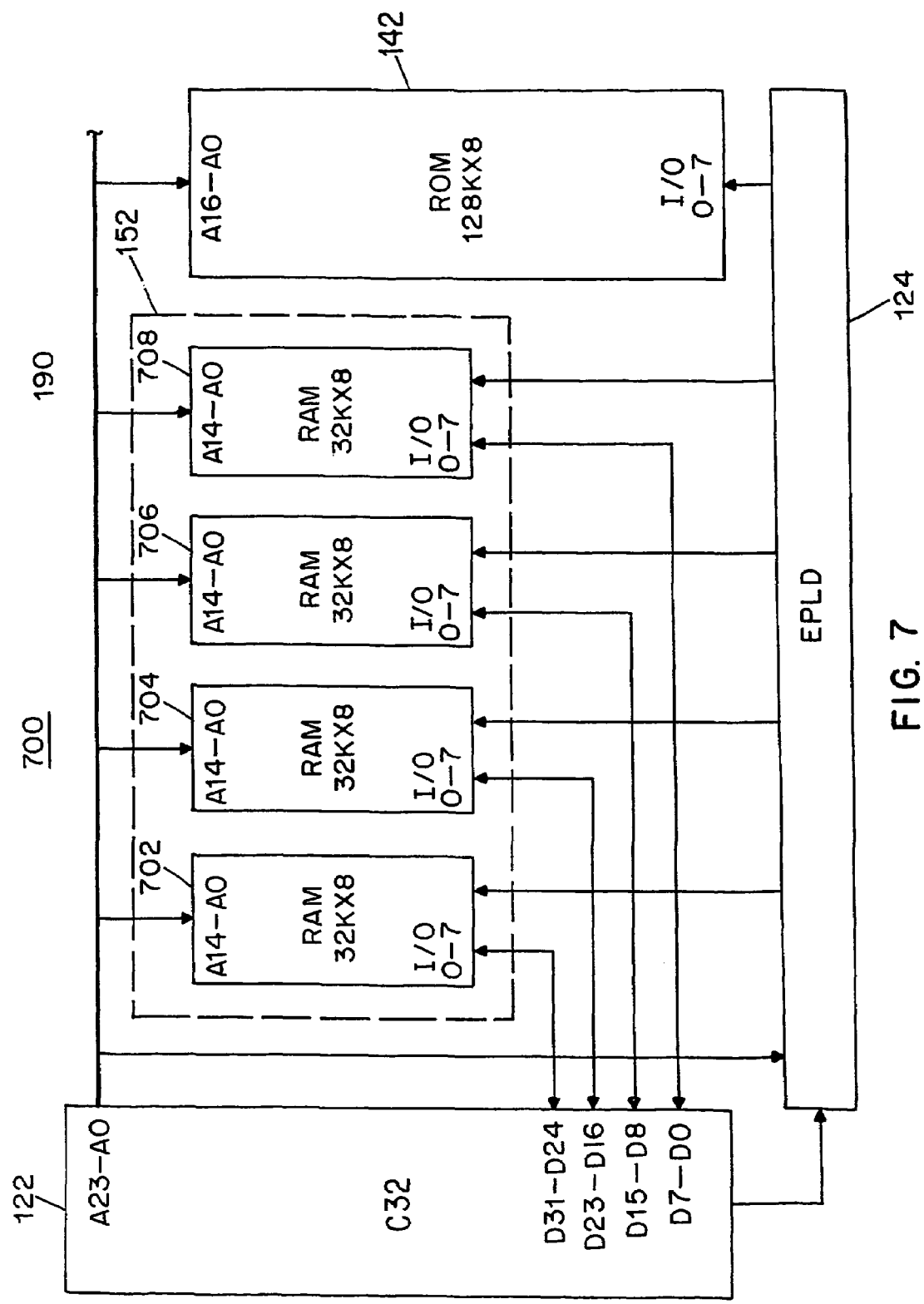
FIG. 7 is a block diagram of a memory interface for the DSP of the network telephony appliance of FIG. 5.

FIG. 7 is a block diagram which illustrates a memory interface 700 suitable for use in the network appliance of FIG. 5. The memory interface 700 includes external memory modules 142 and 152, which themselves include 128 Kbyte of read-only memory (ROM) 142 for program storage and at least 32 Kbytes of double word (32 bit) static random access memory (RAM) 702, 704, 706 and 708. Due to the relatively slow speed of the ROM 142, it is preferable that the network appliance initializes the main program from the ROM and stores this program in the relatively fast RAM for run time execution.

Figure 8:
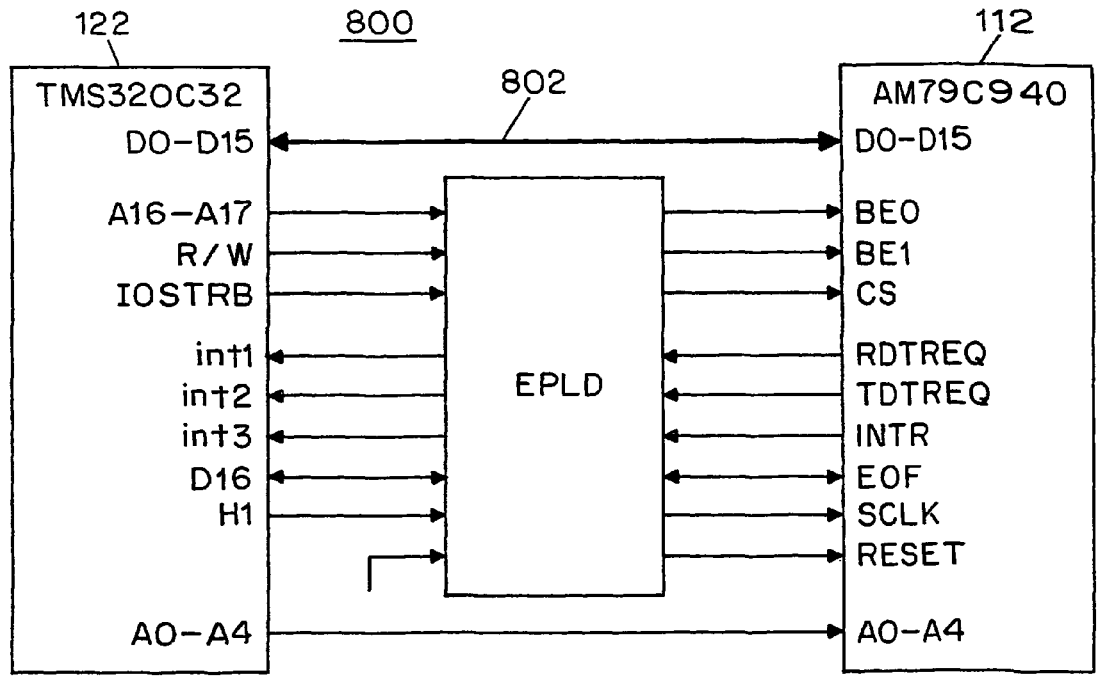
FIG. 8 is a block diagram of a network controller interface for the DSP of the network telephony appliance FIG. 5.

FIG. 8 is a block diagram that shows an exemplary interface between the DSP 122 and the Ethernet controller 124 in accordance with one embodiment of a network appliance. The 32 registers of the Ethernet controller 124 are memory mapped at the 0x810000 memory space of the DSP 122 as shown in FIG. 6. Preferably, the first two registers are receiving and transmitting "first in, first out" (FIFO) queues. The DSP 122 exchanges the data with the Ethernet controller 124 via a 16 bit data bus 802.

Figure 9:
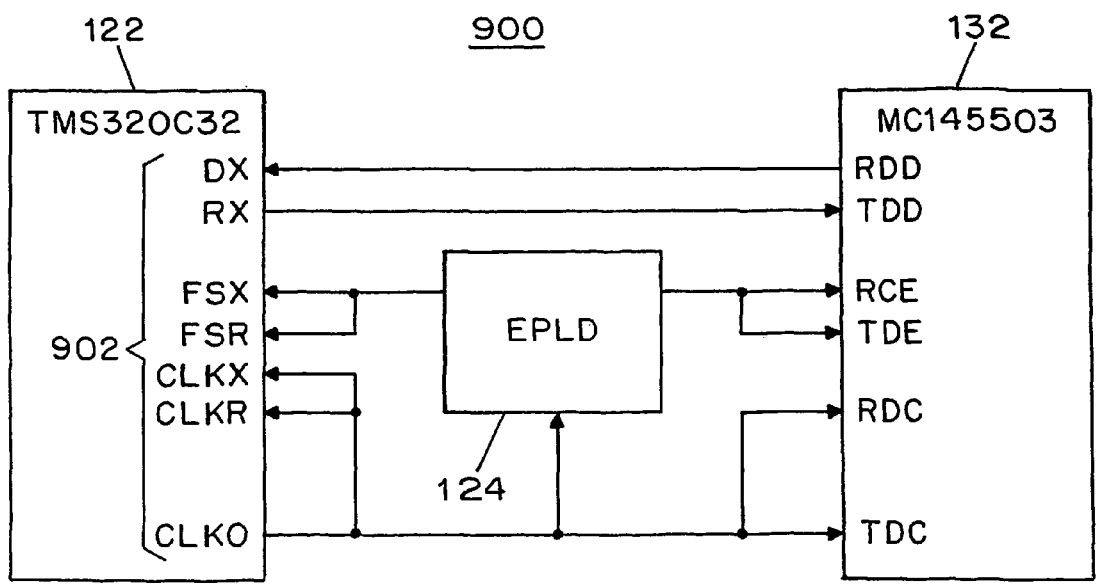
FIG. 9 is a block diagram of a codec interface for the DSP of the network telephony appliance of FIG. 5.

FIG. 9 is a schematic diagram which illustrates an interface between the DSP 122 and the PCM codec 132 in accordance with a preferred embodiment of the present invention. As shown in FIG. 9, the DSP 122 connects to the PCM codec 132 via an internal serial port 902. The serial port on the DSP 122 is an independent bidirectional serial port.

As shown in FIG. 5, the DSP 122 is also operatively coupled to the LCD 164. The LCD control interface is mapped at the DSP addresses shown in FIG. 10. In one embodiment, the LCD 164 is a 120×32 pixel LCD such as the MGLS-12032AD LCD, manufactured by Vazitronics. Since the access speed of the LCD is generally slow, data displayed by the LCD can be mapped into the STRB0 (1X1000) memory space of the DSP 122, which is the same memory space as ROM memory space. Preferably, the LCD timing logic is the same as the timing logic for the DSP 122. However, when the LCD is composed of a left-half and a right-half, such as in the MGLS-12032, it is necessary to control and program for both of halves of the LCD when displaying an entire line message.

Figure 11:
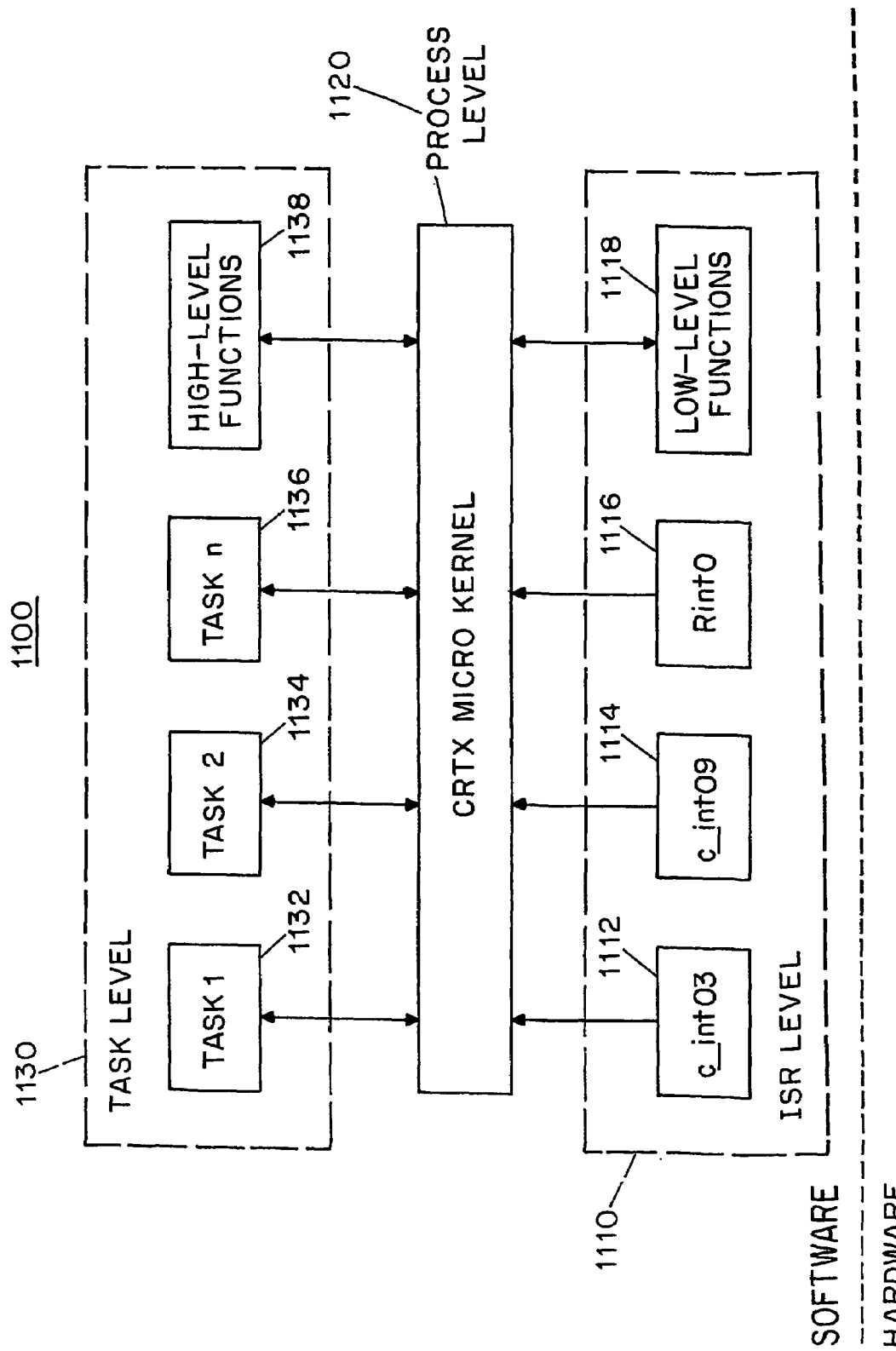
FIG. 11 is a block diagram showing the software architecture for the network telephony appliance of FIG. 4.

FIG. 11 is a block diagram showing an example of the software architecture for the present network appliance. As shown in FIG. 11, the processing architecture for the present network appliance is generally organized into three levels: the ISR (Interrupt Service Routine) level 1110; the operating system or Process level 1120; and the application or Task Level 1130. An exemplary list of functions and tasks which can be performed at each of the software levels is provided in FIG. 13.

The lowest level, the ISR level 1110, includes interrupt handlers and I/O interface functions. The ISR level 1110 serves as the interface between the process level 1120 and the network appliance hardware shown in FIGS. 4 and 5.

Figures 10, 12:
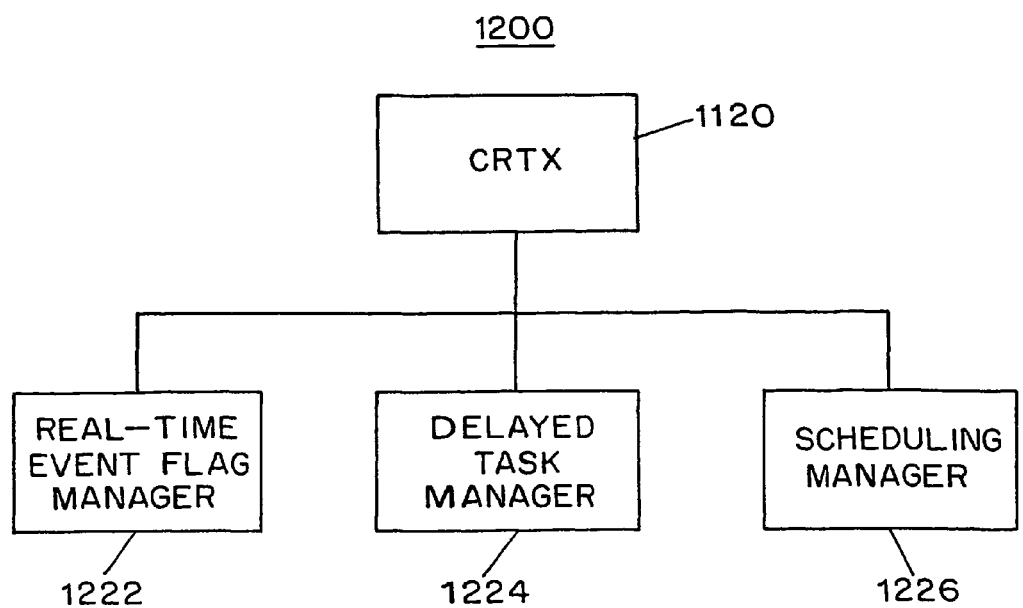
FIG. 10 is an exemplary memory map for the DSP of FIG. 5 showing a mapping of the LCD control interface to DSP memory addresses.
FIG. 12 is a block diagram showing the scheduling mechanisms of the process level software of FIG. 11.

Above the ISR level 1110 is the process level 1120, or operating system, which is preferably a real-time multitasking micro-kernel, such as StarCom's CRTX Embedded Real-time micro-kernel. Generally, the process level software 1120 (micro-kernel) performs memory management, process and task management, and disk management functions. In a preferred embodiment of the present invention as shown in FIG. 12, the micro-kernel supports three scheduling mechanisms: a Real-time Event Flag Manager 1222; a Delayed Task Manager 1224; and a Scheduling Manager 1226. The micro-kernel has three separate queues for the three different mechanisms above, respectively.

The Real-time Event Flag Manager 1222 is used to trigger the execution of real-time events by way of setting flags. If a flag is set to an "ON" condition, the task associated with the flag is immediately executed. For example, an interrupt service routine would set a particular flag when a certain event occurred. Flag events are entered on a flag queue with an associated task address.

The Delayed Task Manager 1224 is responsible for timed events. A timed task, such as a fail-safe or "watchdog" task, can be executed after a certain time delay. If a certain event does not occur within a certain time frame, the timer triggers the task causing it to be executed. Another example is the repeated execution of a task controlled by a periodic timer. In an exemplary embodiment, there are 10 timer entries. Each timer is loaded with a tick count and is then decremented on every timer tick from the hardware's interval timer. When the count reaches zero, the task associated with the timer is scheduled on the task queue. The Scheduling Manager 1226 scans the task schedule queue looking for scheduled tasks. Upon discovery of an entry in the queue, control is passed to a scheduled task.

FIGS. 13a–f are tables which list exemplary software tasks and functions which can be part of the task level software (FIGS. 13a–c), process level software (FIG. 13d) and ISR level software (FIGS. 13e–f). For the purposes of the present invention, the terms "task" and "function" as referred with respect to the software architecture are considered to be synonymous. However, "tasks" are generally executed by the Scheduling Manager 1226, whereas "functions" are generally called by tasks or other functions. The application tasks, such as the call processing (Call_task) and IP processing (IP_Send task and Ercv_task, etc.) tasks, are scheduled by the Process level software 1120. The execution of such tasks is a result of a prior scheduling by an ISR, another task, or by the current task itself.

FIGS. 13A–F illustrate exemplary function and procedure definitions called in an event driven operation performed by the present packet data network telephone software of FIG. 11. The functions, which are called on the occurrence of various events, enable operation of the packet data network telephone/system and include gross operations such as: initializing the Packet data network telephone/system; processing ARP data; encoding voice data; processing message data; processing IP data; decoding voice data; transferring analog and digital data to and form corresponding buffers; and performing "watchdog" functions.

Initialization of the packet data network telephone appliance includes the steps of hardware initialization and task scheduling. After power on, the DSP 122 will automatically transfer the main program from the ROM 142 to the RAM 152 (boot operation). Hardware initialization occurs in a traditional manner, including the steps of: initializing the stack pointer, external bus interface control register, global control register of the DSP, interrupt vector for the ISR, and the like.

After completion of the hardware initialization and preliminary task scheduling, processing control is returned to the process level (micro-kernel) 1120. The CRTX micro kernel 1120 and the scheduled tasks then control further processing.

Referring again to FIG. 13A, the task level software of the present network appliance includes Address Resolution Protocol (ARP) processing. ARP is a known TCP/IP protocol used to convert an IP address into a physical address (called a Data Link Control (DLC) address), such as an Ethernet address. A host computer wishing to obtain a physical address broadcasts an ARP request onto the TCP/IP network. The host computer on the network that has the IP address in the request then replies with its physical hardware address.

Figure 14:
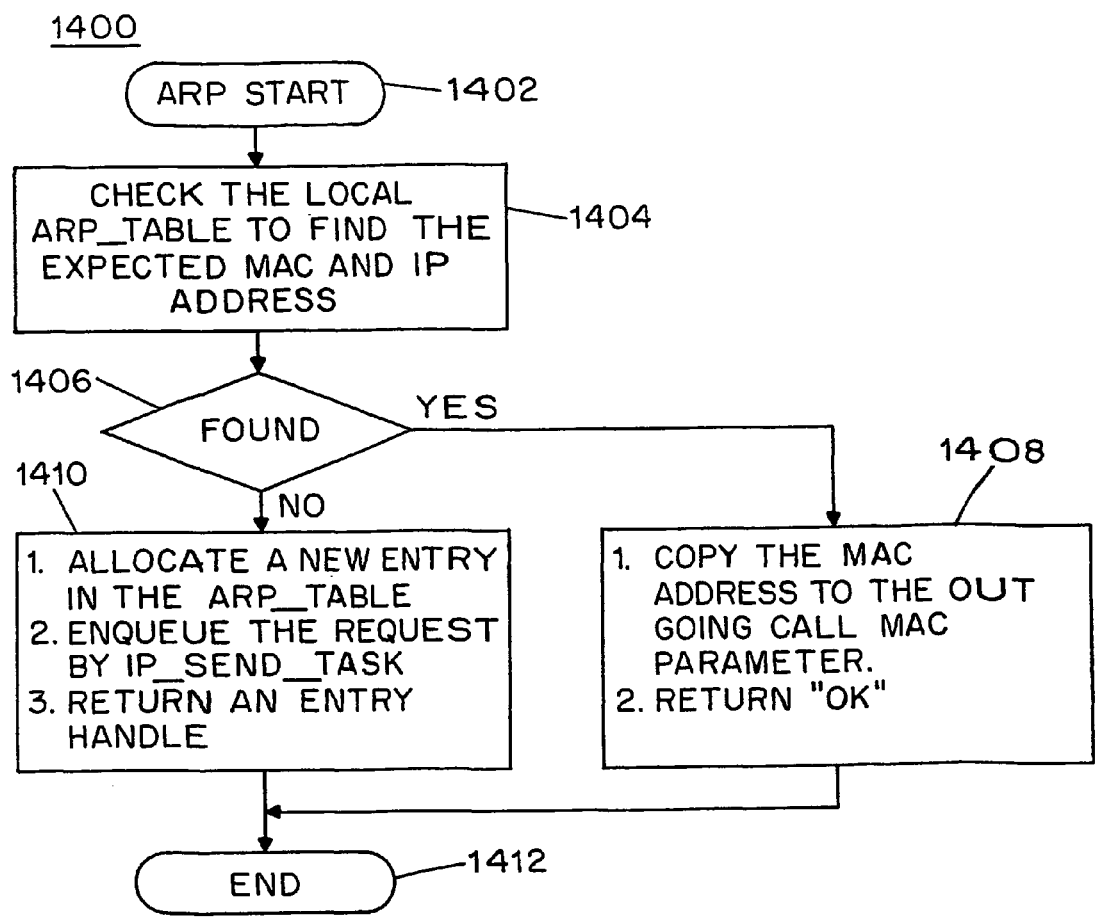
FIG. 14 is a flow diagram of an ARP request output procedure in accordance with the hardware and software architectures of FIGS. 4, 11 and 13.

FIG. 14 is a flow diagram illustrating of an ARP request output procedure 1400, ARP_Out( ). As illustrated in FIG. 13 B, ARP_Out( ) is a component of the task level software which receives an IP address to be resolved, and outputs a corresponding MAC address. When a ARP request begins (step 1402) the ARP_Out( ) function first checks the requested IP address from a local ARP cache table, arptable (step 1404). If the corresponding entry is RESOLVED at step 1406, then ARP_Out( ) copies the MAC address from arptable to the requested parameter and returns a ARPOK status flag (step 1408). Otherwise, the procedure will allocate an entry in the arptable and schedules a ARP request (step 1410). As further shown by step 1410, a MAC address, i.e., "handle," of the arptable is returned to the main program (c_int00( )). According to the handle, the software then checks the corresponding entry's ae_state.

Figure 15:
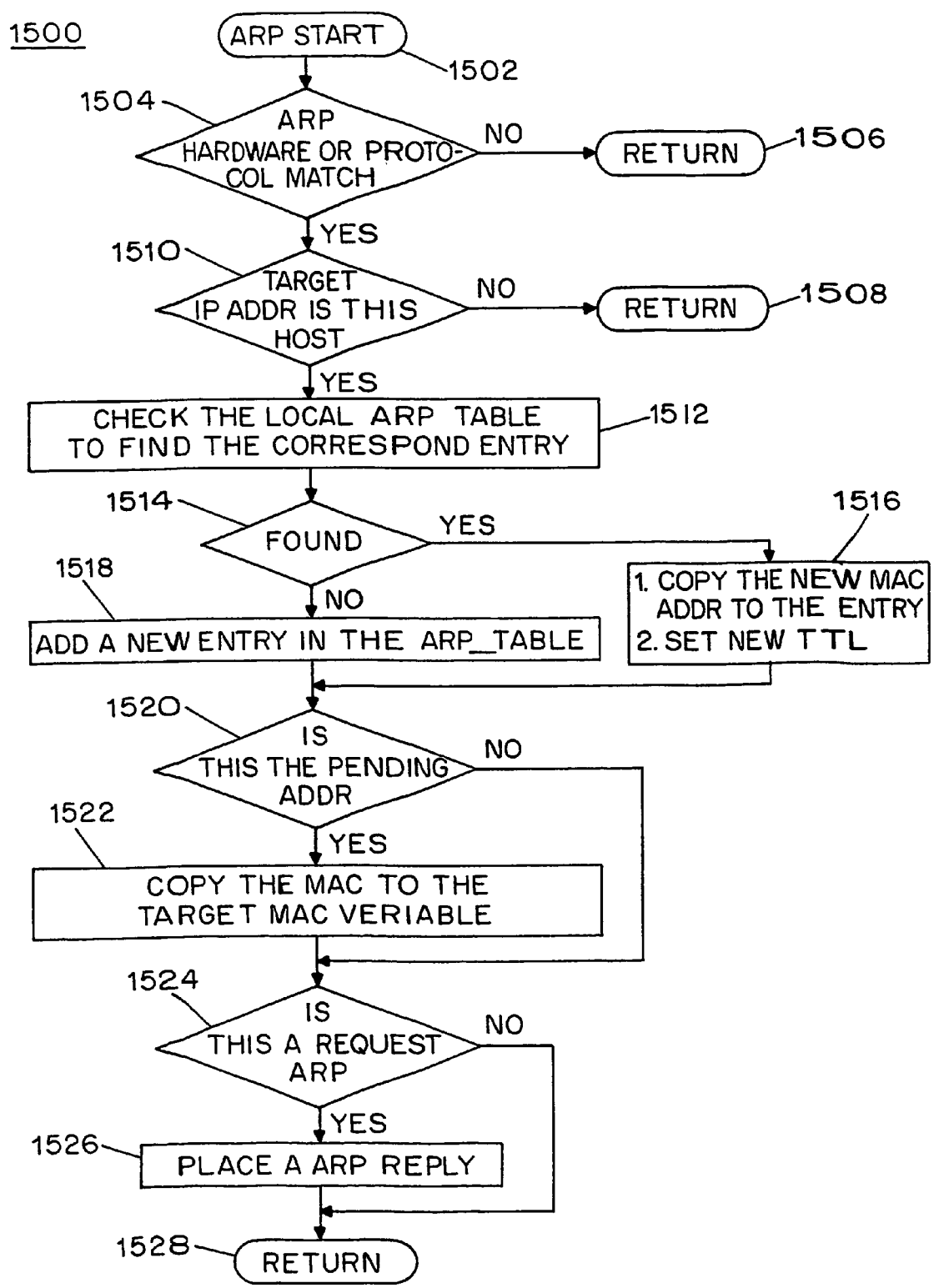
FIG. 15 is a flow diagram of an ARP request input procedure in accordance with the hardware and software architectures of FIGS. 4, 11 and 13.

FIG. 15 is a flow diagram of an exemplary ARP request input procedure 1500, ARP_In_task( ), which is a component of the task level software listed in FIG. 13A. The ARP_In_task receives an ARP packet, and either modifies the arptable or queues an ARP reply if the incoming packet is an ARP request. When receiving an ARP packet (step 1502) the software will check whether the packet's ARP hardware or protocol types match (step 1504). If the types do not match, control is returned to the main program (step 1506). If one or both of the types match, then the software checks if the destination host is the present host (step 1510). If the destination host is not the present host, then control is returned to the main program (step 1508).

As further shown in FIG. 15, if the destination host is the current host, then the ARP_In_task next checks the ARP table to determine whether there is a corresponding ARP entry for the incoming packet (step 1512). If an entry is found (step 1514), then the new MAC address is copied into the existing entry and modifies the entry's "Time to Live" (TTL) to a new value (step 1516). A TTL is understood by those with skilled in the art to be a field in the Internet Protocol (IP) that specifies how many more hops a packet can travel before being discarded or returned to the sender. However, if there is no such MAC entry is found in accordance with step 1513, then the ARP_In_task adds a new MAC entry in the ARP table (step 1518). If the MAC entry is in a PENDING state (step 1520), it is then changed to a RESOLVED state and the MAC address is copied to the target entry (step 1522). If the incoming ARP packet is an ARP request from another host, an ARP reply packet is sent by queuing the IP_Send_task, steps 1524 and 1526. Control is then returned to the main program (step 1528).

In addition to the ARP input and output processes, ARP processing at the task level includes an ARPTimer_task( ), which is a delayed loop task used to maintain the ARP entry table arpentry. Nominally, the ARPTimer_task( ) is generated once per second. The main purpose of the ARPTimer_task( ) is to decrease the "Time to Live" (TTL) of the ARP entry and to resend the ARP request during the pending state in case the previous ARP request is lost.

Task level processing can also include processing operations associated with the coding and decoding of audio packets. The Codec_task generally includes a SpeechEncode( ) function, which encodes speech data from the ADBuf buffer to the EncodeBuf according to the algorithm indicated by "type" parameter. The coded data is then sent out via the queue IP_Send_task, with the "RTP" parameter set.

Figure 16:
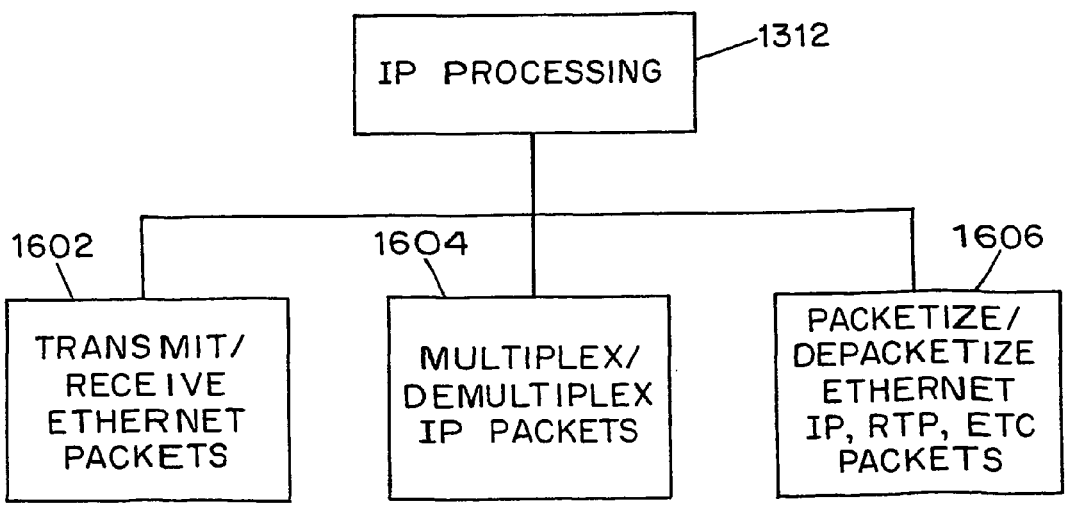
FIG. 16 is a diagram showing the IP processing steps in accordance with the hardware and software architectures of FIGS. 4, 11 and 13.

Task level operations can also include Internet protocol (IP) processing. The general IP processing operations are illustrated in the block diagram of FIG. 16. As shown in FIG. 16, IP processing includes the steps of: transmitting and receiving Ethernet packets, step 1602; multiplexing and de-multiplexing IP packets, step 1604; and packetizing and de-packetizing Ethernet, Internet Protcol (IP), User Datagram Protocol (UDP), Real-Time Transport Protocol (RTP) and Address Resolution Protocol (ARP) packets, step 1606.

In accordance with step 1602 of FIG. 16, packet transmission can be performed using direct memory access (DMA) channels of the Ethernet controller 112. DMA is a technique for transferring data from main memory to a device without passing it through the CPU. Since DMA channels can transfer data to and from devices much more quickly than with conventional means, use of DMA channels are especially useful in real-time applications, such as the present network telephony system.

The network controller 110 preferably supports a plurality of DMA channels, such as the DMA1 channel of the Ethernet controller 112 that can be used for packet transmission. When an Ethernet packet is ready for transmission, the DMA1( ) function, an ISR level function, is called by setting the source address (Ethernet packet buffer, ESend), destination address (Ethernet controller's transmit FIFO), and a counter (the packet length). Examples of Ethernet transmit data structures are provided in FIG. 17. The DMA1( ) function then starts the DMA1 channel. When the counter reaches zero, the DMA1 stops and waits for the next call.

Figure 18:
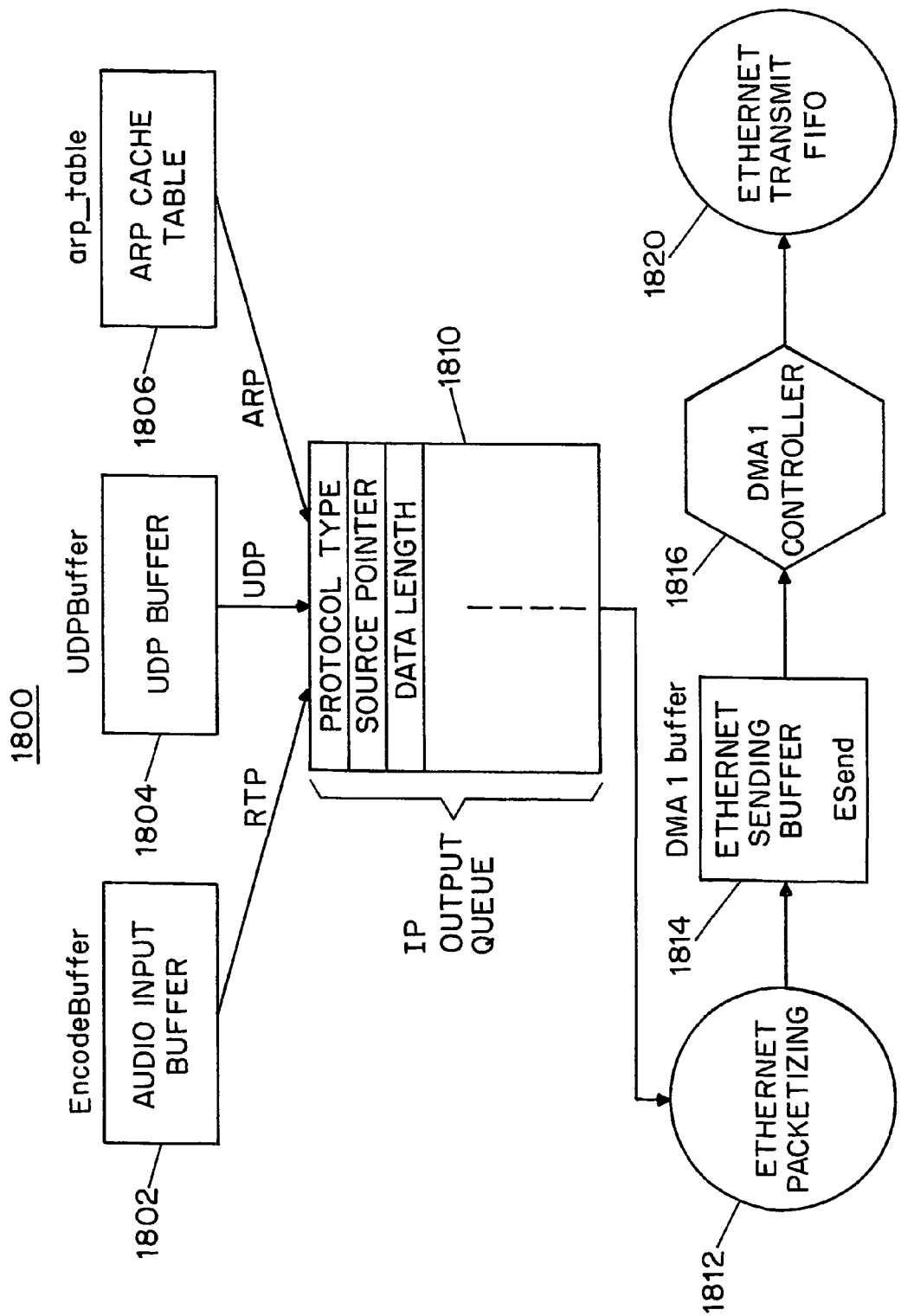
FIG. 18 is a data flow diagram of a packet sending procedure in accordance with the hardware and software architectures of FIGS. 4, 11 and 13.

FIG. 18 is a block diagram which shows the data flow between an audio input buffer 1802, a UDP buffer 1804 and ARP table 1806 to the Ethernet interface (Ethernet Transmit FIFO) of the Ethernet network controller 112. As further shown in FIG. 18, data from the audio input buffer 1802, the UDP buffer 1804 and the ARP table 1806 is sent to an IP output queue 1810, and is arranged to indicate the protocol type, source pointer and data length. Instead of queuing the sending data, the IP_Send_task is queued by process level software (micro-kernal) 1120. The protocol types supported by the IP_Send_task generally include UDP, RTP, ARP_REQUEST, ARP_REPLY. IP_Send_task is used for packet transmission and Ethernet packetizing. Preferably, IP_Send_task is scheduled by other tasks or functions such as SIP_task, ARP_Out( ), SpeechEncode( ), etc. Once the IP_Send_task is run, it checks the protocol type of the data. This task then encapsulates the output data into the corresponding Ethernet packet in the ESend buffer. Finally, the packet is sent out via the assigned DMA channel DMA1).

Figure 19:
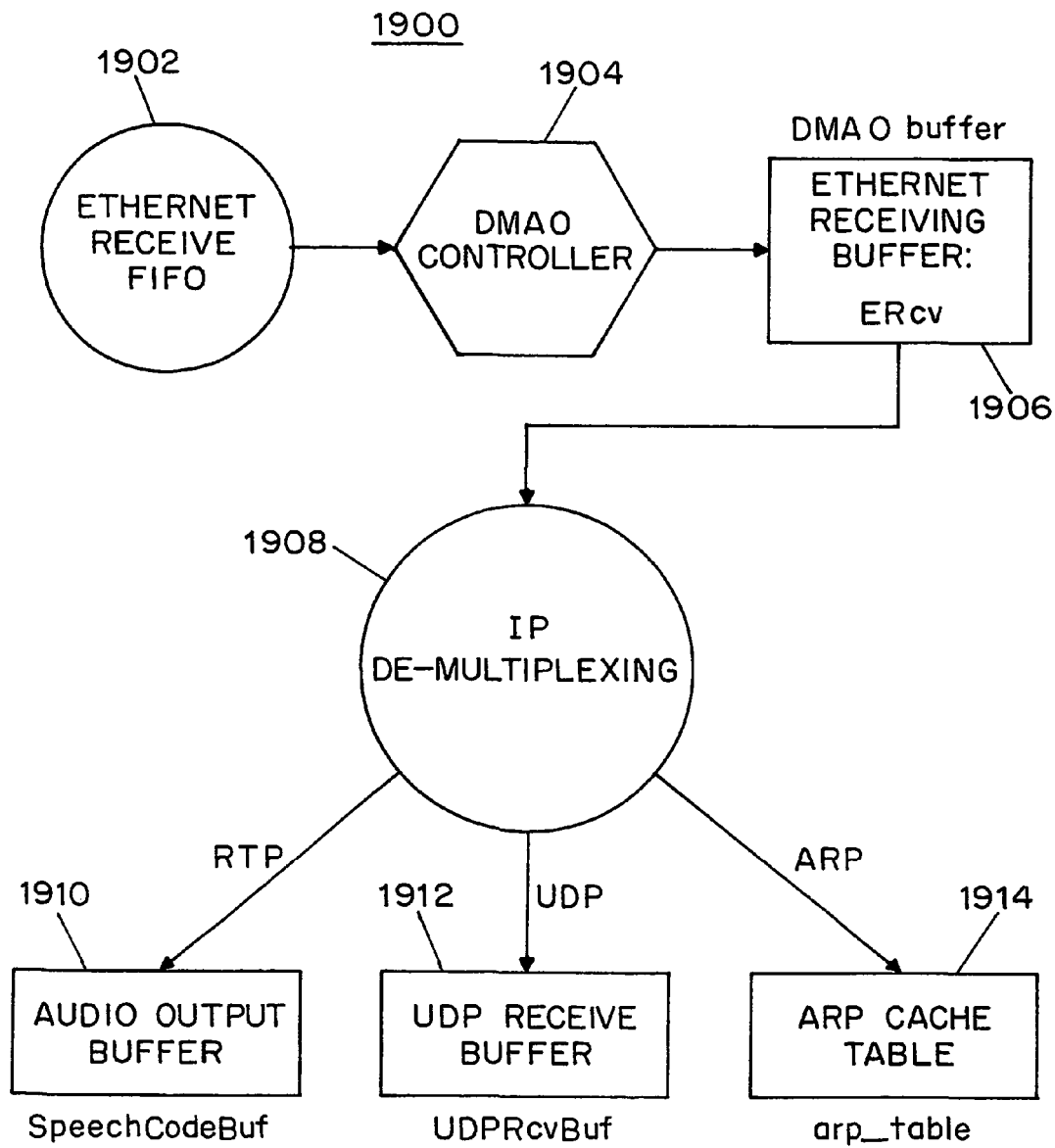
FIG. 19 is a data flow diagram of a packet receiving procedure in accordance with the hardware and software architectures of FIGS. 4, 11 and 13.

FIG. 19 is a data flowchart further illustrating packet receiving and de-multiplexing operations. The de-multiplexing is realized by scheduling different tasks for different protocols in the Ercv_task. In further accordance with step 1602 of FIG. 16, packets are received in the receive data FIFO memory (step 1902) and are further processed by a DMA0 channel controller (step 1904). Since the DSP 122 doesn't know when the packets will arrive, the DMA0 channel is active all the time (i.e., it does not stop even the counter reaches zero). When a packet arrives, the DMA0 channel will automatically copy it from the Ethernet controller's receiving FIFO to the Ethernet receiving buffer, Ercv (step 1906). The DMA0channel stops when there is no data available in the FIFO.

ERcv_task is a flag trigger task for Ethernet packet de-packetizing and IP packet de-multiplexing (step 1908). The Ercv_task functions as follows: first, a PacketCheck( ) function is called to check the incoming packet. The PacketCheck( ) will return the protocol type of the packet, or NULL if the packet is invalid. Second, depending on the returned protocol type, the ERcv_task will trigger the different tasks to process the received packet, RTP_In_task for "RTP" packet (step 1910), ARP In_task for "ARP" packet (step 1912) or UDP processing tasks (step 1912) for UDP packets, for example.

Referring to FIG. 13C, SpeechDecode( ) is a voice decoding function associated with the RTP processing of step 1910. First, a SpeechDecode( ) task checks if there are data available in the decoding buffer, DecodeBuf. If data is available, e.g., RcvFlag is SET, then SpeechDecode( ) decodes it according to the data type of receiving data, PCM (G.711), G.723, G.729, for example. The decoded data is sent into the D/A buffer, DABuf.

The A/D and D/A interrupt routine can be triggered by an internal interrupt source, e.g., Rint0( ). Preferably, the A/D and D/A interrupt routine is triggered by an 8 kHz sampling frequency provided by the DSP. Since this routine is called frequently, Rint0( ) is preferably written in assembly language. The steps performed by Rint0( ) include the steps of: reading a D/A sample from D/A buffer, DABuf, sending the sample to the serial D/A port; obtaining a sample from the serial A/D port; saving the A/D sample to an A/D buffer, ADBuf; and incrementing A/D and D/A buffer pointers, ADPnt and DAPnt, by one.

FIGS. 20A and 20B are block diagrams which show an A/D and D/A "ping-pong" buffer scheme used by the software of the present invention. Further, if the current A/D pointer value (ADPnt )exceeds a predetermined buffer threshold (ADTh) then a flag is set in the flag task queue indicating that service is required.

The A/D and D/A buffers can be divided into two parts, the upper buffer 2002a and lower buffer 2002b, respectively. Both buffers can be designed as circular buffers. In this way, when the current pointer reaches the buffer bottom, it wraps around to its beginning. However, from the encoder and decoder point of view, it is used as a two-frame ping-pong buffer (defined as upper frame and lower frame) scheme. The operation of this process is shown in FIGS. 20A and 20B. For A/D conversion, when the upper (or lower) is full, the data in the upper (or lower) buffer will be passed through ping pong switch 2004 and copied to the speech encode buffer, EncodeBuf, 2006. For D/A conversion, if the upper (or lower) buffer is completed, a new frame of data will be copied from the speech decode buffer, DecodeBuf, 2010 to the upper 2008a (or lower 2008b) buffer. This mechanism ensures that while the encoding (or decoding) algorithm reads(writes) from one part of the buffer, the A/D (or D/A) sampling ISR can write (read) the other part of the buffer without conflict.

Figure 21:
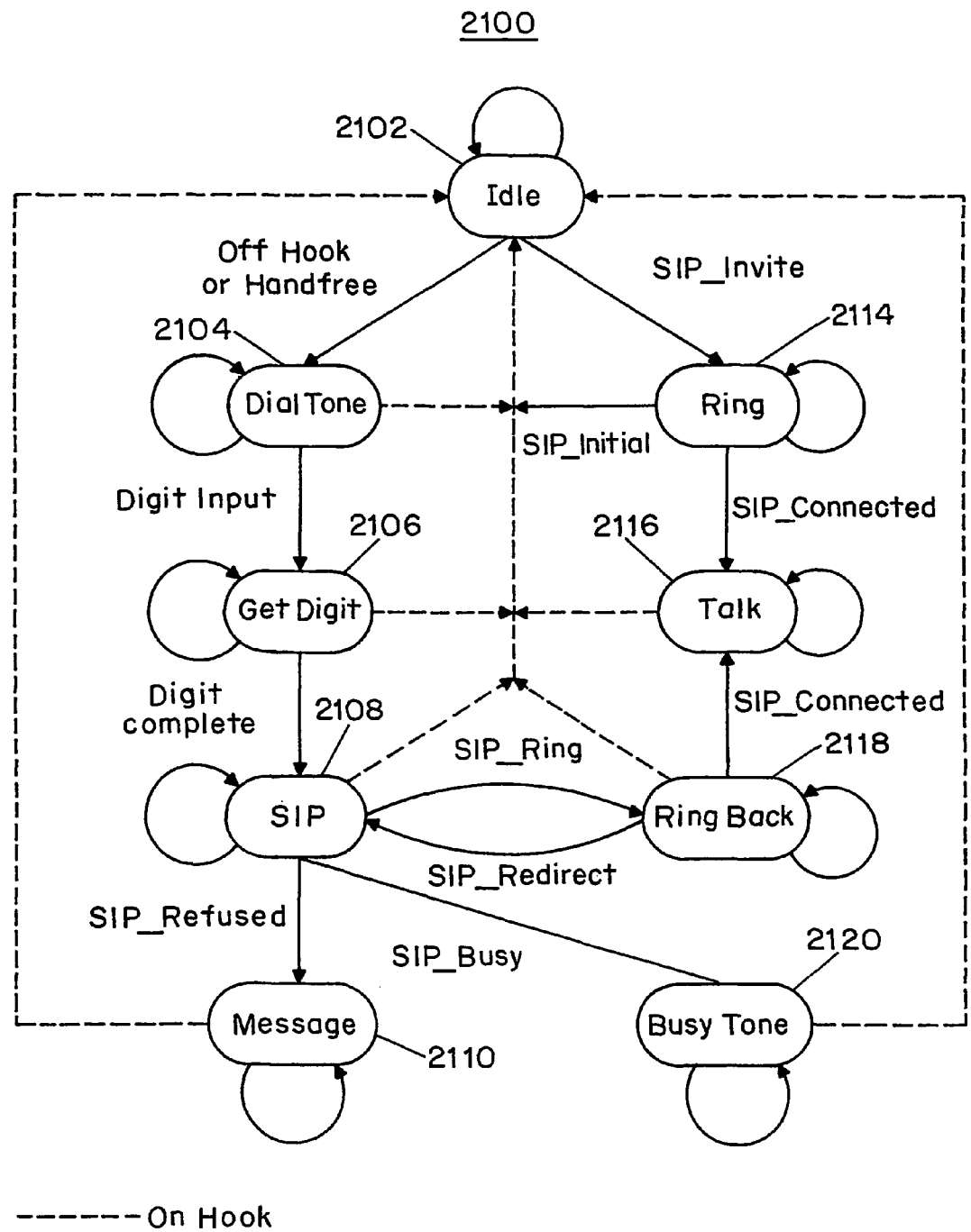
FIG. 21 is a state transition diagram of the Call_task process of the present network telephony appliance.

FIG. 21 is a state transition diagram of a Call_task subroutine used in an exemplary embodiment of the present network appliance. Call_task is a looped task which handles the call procedure. As shown in FIG. 21, the "Idle" state 2102 occurs when there is no call being made and there is no incoming call. When this condition exists, the Call_task loops in the "Idle" state 2102. The "DialTone" state 2104 exists when the receiver state is OFFHOOK, or the handset state indicates HANDSFREE, and thus the Call_task state will change from the "Idle" state 2102 to the "DialTone" state 2104 when a OFFHOOK or HANDSFREE condition exists. These states are generally entered by an input by a user through the user controls 160 indicating that a call is to be initiated. When the Call_task state is in the DialTone" state 2104, the Codec_task will be configured as "ToneMode, DialTone" and a dial tone is sent to the handset components of the user interface 160.

Referring again to FIG. 21, while in the "DialTone" state 2104, if any digit key ('0 . . . '9', '*' and '#') or the redial button is pressed, the call state changes from the "DialTone" state 2104 to the "GetDigit" state 2106. In the "GetDigit" state 2106, the dial tone is stopped at the handset.

After the callee's number has been input and an ENTER button has been pressed by the user to indicate that dialing is complete, the Call_task will check if the input is valid. If the number is valid, a call entry is created by a function CreateSipCall( ) and the Call_task will go into a "SIP" state 2108. Otherwise, if the input number is invalid, the number is requested again and the state remains at the "GetDigit" state 2106.

While waiting for SIP_task processing, several decisions may be made depending on the "SIP" state 2108. The "SIP" state 2108 is a global variable, SIP_status, which is modified by the SIP_task according to its state transition. If the "SIP" state 2108 changes into SIP_Ring, the Call_task will change to the "RingBack" state 2114 and the Codec_task will be configured as "ToneMode, RingBack" mode. When the Codec_task is in the "ToneMode, RingBack" mode, a ring back tone is sent to the handset.

From the "SIP" state 2108, if the "SIP" state 2108 changes to SIP_busy, the Call_task and thus the call will change into "BusyTone" state 2120 and the busy tone will be played at the handset. It the "SIP" state 2108 changes to SIP_Refused, appropriate messages will be displayed on the LCD screen related to the SIP_Refused state.

From the "RingBack" state 2118, if the "SIP" state becomes SIP_Connected, the Call_task state changes to the "Talk" state 2116. When the Call_task state is in the "Talk" state 2116, the Codec_task will configured as SpeechEncode and SpeechDecode mode.

For incoming calls, while in the "Idle" state 2102, if the "SIP" state 2108 is SIP_Invite, the Call_task state changes to the "Ring" state 2114 and the Codec_task will be configured as "ToneMode, RingTone." When the Codec_task is configured as "ToneMode, RingTone," a ring tone will be played on the loudspeaker. After the SIP state becomes SIP_Connected, the Call_task state will change into the "Talk" state 2116. Otherwise, if the SIP state becomes SIP_Cancel, which happens if the caller gives up the call, the Call_task state returns to the "Idle" state 2108.

While at the "Idle" state 2102, if the ENTER button is depressed, the Call task calls the Setting_task. When the parameter setting program is finished, it will return to Call_task.

During Call_task execution, if the hook state indicates the receiver is ONHOOK, or a system error is found, the Call_task changes to the "Idle" state 2102, regardless of what the previous state is (except the "Ring" state 2114).

In the preferred embodiment of the network appliance as shown in FIG. 5, the key pad of the telephone has 17 keys for providing user inputs and commands. The telephone key pad includes 10 digit keys, two special keys and five function keys are defined as shown in FIG. 22.

The Key_task is a loop delayed task which runs periodically, such as every 0.1 seconds. When started, Key_task first calls the key( ) function. If the return value is not "−1", it means a key has been pressed. Then, the KeyMap( ) function maps the input binary key word to the ASCII key word. The Key_task then sets the corresponding member of the FuncKey structure. If the system is ready to accept the key input (the KeyRegEnable is indicated), the input key word is stored into the KeyBuf.

In addition, Key_task preferably supports four different input modes: digit input mode, IP address input mode, alphabet input mode, and list address input mode. Switching among the four modes can be done by pressing the ENTER button before dialing any number or alphabet when the handset is picked up and a dial tone is heard. After input is complete and the ENTER button is pressed, the input numbers will be transferred to the current task (Call_task or Setting_task) by a message pipe. If the Redial key is pushed, the task will copy the previous input from the backup buffer, KeyBackup, to the KeyBuf. Then the data will be transferred to Call_task.

The operating system of the present network appliance preferably supports a delayed task schedule scheme. The delayed task is similar to the sleep( ) function in UNIX. However, a delayed task can also be a persistent task execution from a periodic timer when the task's repeating flag is set. For delayed tasks, the process level software 1120 requires an interval timer to provide a system tick. The system of FIG. 5 uses the TMS320C32's timer1, TCLK1, as the system timer base.

The Clock_task is a looped delayed task which performs real time clock and calendar functions. It serves as the general clock to calculate and display the current time, including the hour, minute and second. When a call is connected, it can display the call duration. When the phone is on hook, current year, month and date can also be displayed on the LCD.

Referring again to FIG. 11, the Network telephone software of the present invention includes several low-level functions that are included as part of the software ISR level. Some of these low-level functions are I/O related functions, which are used with the telephone's 8-bit I/O parallel port defined in FIG. 24. The low-level, I/O related functions include: the "Hook" state monitor, Hookst( ); the Key input availability check and read, Key( ); handset and hands-free control, HandSet( ); Ethernet controller reset, ENET_reset( ); volume control, AmpControl( ); and software reset of the system.

The audio interface chip 136, which preferably takes the form of an LM4830, can be used to control switching between the handset and the hands-free mode. For example, the HandSet( ) function can write a '0' to the I/O port when "hands-free" mode is required or write a '1' to the appropriate port when "handset" mode is required.

The low-level functions of the present invention also include the Ethernet controller interrupt ISR, c_int03( ). The global message structure for use with c_int03( ) is defined for the state of the Ethernet controller as shown in FIG. 25. Whenever a packet has been sent, or a received packet is complete, the Ethernet controller will interrupt the DSP 122 to indicate the interrupt. The DSP 122 will read the transmission and receiving states from the Ethernet controller's register and then store the state into the above state structure. This information can be checked by other tasks. In addition, these messages are read after each packet transmission. Otherwise, the Ethernet controller will be blocked.

As noted above, it is preferred that the present network appliance of the present invention uses the RTP protocol to transmit and receive speech packets in real time. The RTP packet is encapsulated in an UDP packet. The IP_Send_task and the RTP_In_task modules operate to create and parse RTP packets. FIG. 26 shows an RTP header structure for RTP packet processing. When the IP_Send_task gets a request to send a RTP packet, it first generates an Ethernet and UDP header. Next, it adds the RTP header in the Ethernet packet transmission buffer. Finally, the RTP data is copied into the RTP data area and is sent over the data network.

Figures 27, 28:
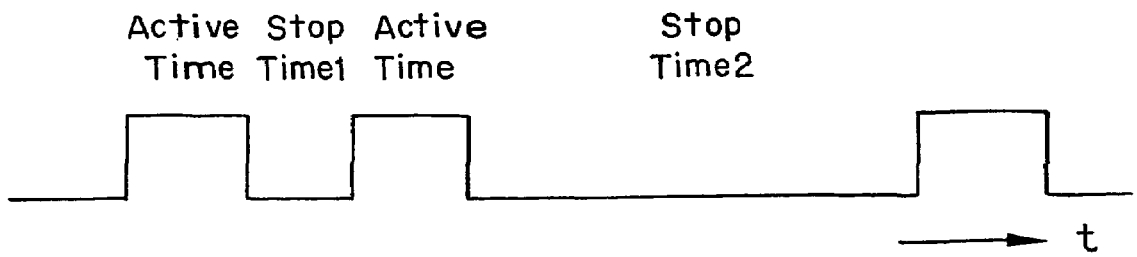
FIG. 27 is a data structure for use with a tone generation function of the Packet data network telephone of FIG. 5.
FIG. 28 is a timing diagram for the tone generation function of the network telephony appliance of FIG. 5.

FIG. 27 shows a data structure for use with a tone generation function, Tone_task( ). The parameters described in FIG. 27 are illustrated in the tone generation timing diagram of FIG. 28. Tone_task is a delayed task which can be executed about every 0.1 second. It is used to count the tone active and stop duration defined in the ToneType structure. Tone_task sets ToneState to ACTIVE during burst and STOP during silence. Different active and stop duration generates different tones. They are: Dial tone, continuous tone (no stop); Busy tone, burst 0.5 s and silence 0.5 sec; Ring back tone, burst 2 sec and silence 4 sec; Ring signal, burst 0.8 sec twice in two seconds, then silence 4 sec. The ToneGenerate( ) module generates a one frame 400 Hz tone or a 2400 Hz ring signal defined by "mode" parameter when ToneState is ACTIVE. Otherwise, a one frame silence signal is provided.

The network appliance of the present invention generally uses UDP as its transport protocol for SIP. SIP_task is a looped task that handles SIP signaling. Since the present network appliance can be used either as a caller or as a callee, SIP_task operates both as a UAC (User Agent Client) and a UAS (User Agent Server).

FIG. 29 is an example of source code which shows data structures used for processing the SIP requests or responses in accordance with the SIP protocol. Tstate is the state transition structure used in SIP_In_task and SIP_task for SIP state transition. Parsed SIP messages are in the data structure message_t. The structure call is defined for each call and the total call entries are defined by msg[MaxSipEntry].

Figures 30, 31:
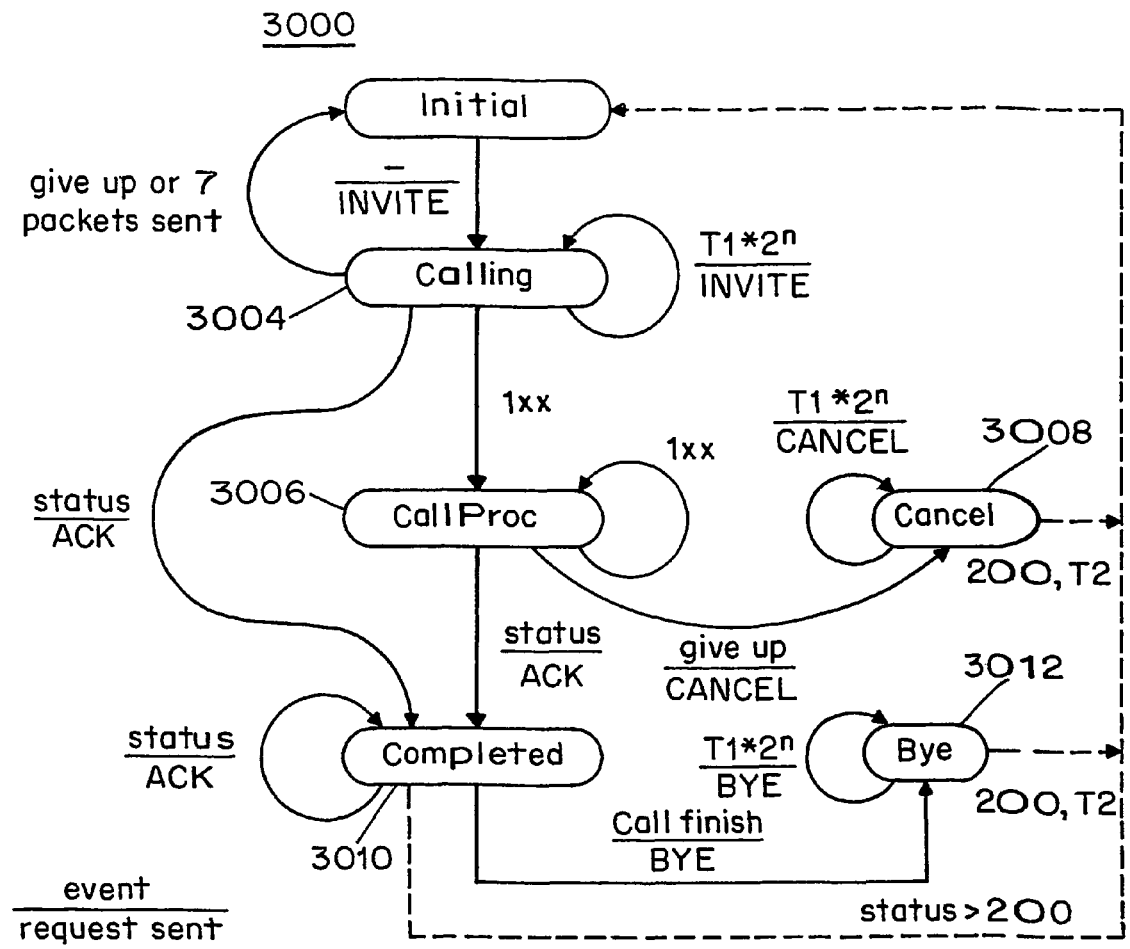
FIG. 30 is a state transition diagram illustrating the network telephony appliance operating as a client (initiating a call) in accordance with FIG. 5.
FIG. 31 is list of SIP_task responses in accordance with the network telephony appliance of FIG. 5.

FIG. 30 is a state transition diagram of the SIP_task operating as a client (e.g., a caller). When the SIP phone starts a call, it works as a client. A call will be created via the following steps: a call entry msg[CurrentIndex] is allocated when the phone is picked up and the flag of the call is SET; CreateSipCall( ) creates a SIP packet according to current setting and dial inputs, wherein the SIP package is used as the reference of the call and the us_state is set to UAC; SIPParse( ) generates the message structure (msg[CurrentIndex].m) for the call from above packet; the SIP_task will check if there are any active calls—if there is a call (msg

[i].flag is SET), SIP_task will create the corresponding request according to the SIP specification and the SIP states will be updated in SIP_task as shown in FIG. 30.

FIG. 30 shows an exemplary state diagram for client (caller) operations, referred to as a UAC state transition diagram of SIP_task. From an Initial state (step 3002) a Calling state is entered and a SIP_task retransmits a SIP INVITE request periodically (T1) until a response is received (step 3004). Nominally, T1 is 500 ms initially and doubles after each packet transmission. (Step 3006) T2 is nominally 32 seconds. If the client receives no response, SIP_task ceases retransmission when T2 timer expires and SIP state will be changed to Cancel (step 3008). If the response is provisional, the client continues to retransmit the request up to seven times. When a final response is received, the state will change to Completed and a ACK will be generated (step 3010). When the caller gives up, the state will changed to Bye state (step 3012). BYE requests are also retransmitted during the interval of T1 until T2 expires for the purpose of reliable transmission. The variable, SIP_Status, will be changed according to the response received as shown in FIG. 31. For example, if a 3xx response is received, SIP_task will initiate another call to the redirected address. Other final responses can be displayed on the LCD.

When the network appliance receives a call, the SIP_task functions as a SIP UAS (server). The incoming packets are processed as follows: UDP_In_task accepts the incoming UDP packet and sends the packets to SIP_In_task along with its source IP address and port number. SIP_In_task processes the packet according to the SIP specification and updates the states accordingly. SIP_task will monitor the receiver state, set and decrease the T1 and T2 timer of each call and update the SIP states if necessary.

Figure 32:
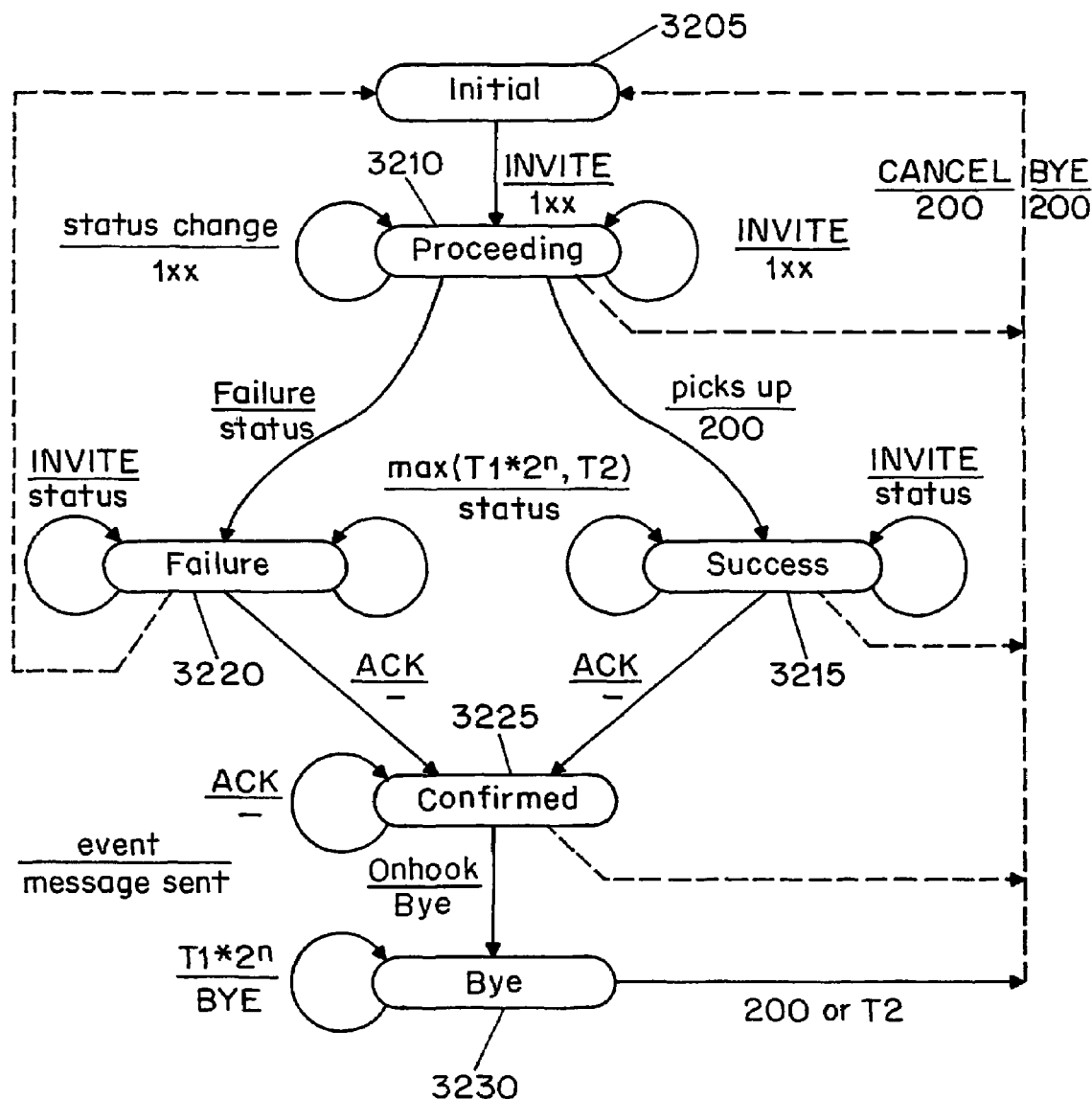
FIG. 32 is a state diagram illustrating the state transition diagram of a SIP UAS in accordance with the network telephony appliance of FIG. 5.

FIG. 32 illustrates an exemplary state transition diagram of a SIP UAS. While the SIP_task remains at an Initial state (step 3205), it listens to the incoming SIP packets. If an INVITE request is received, it generates a Ringing(180) response and its state changes to Invite and the Sip_task module would advance to a Proceeding step (step 3210). If a called party picks up the telephone, the status changes to Picks Up and the process advances to Success (step 3215), indicating a successful call session has been established. If the called party does not pick up, the status changes to Failure and the process advances to the Failure state (step 3220). After success or failure, the client will acknowledge the current status and advance the process to the Confirmed state (step 3225). When the calling party terminates the session, the status changes to Onhook and the process advances to Bye (step 3230) indicating that the current session has been completed.

As set forth herein, the network appliance is a stand alone device capable of initiating and receiving telephone calls on a packet data network. While the stand alone architecture described herein offers many attendant advantages, such as its relatively low cost to implement, similar software architecture and functional definitions described in connection with the stand alone appliance 100 can also be provided on a PC based telephone device. In such a case, a conventional personal computer having a microphone, speakers and suitable network interface card, is provided with software to operate consistently with the manner described above. Of course, changes are effected in this embodiment, such as the user interface components and functions being performed by conventional elements of the PC, e.g., the keyboard, monitor, mouse and the like. A GUI interface to the telephone functionality is provided by the software to enable the desired telephony functions.

The network appliance of the present invention, in addition to performing traditional telephony functions, can also provide a cost effective interface between the network and the environment. While equipping sensors with Ethernet interfaces is not feasible, due to the large number of ports required and the cost of the minimal hardware required, the network appliance of the present invention can become the gathering point for a number of digital and analog sensors. This is accomplished generally by coupling the external sensor to the network appliance via the conventional I/O circuitry 135 which is coupled to the DSP 122. The I/O circuitry can take the form of simple buffers, A/D converters, registers and the like. This feature is particularly useful in environments that have phones for security reasons, e.g., elevators, lobbies, shop floors, garages, etc. Examples include: Passive infrared (PIR) digital sensor for detecting the presence of people—this can be used for automatically forwarding calls if nobody is in the office or as part of a security or energy management system; analog or digital light sensor to detect whether the office is occupied; analog temperature sensor, smoke, carbon monoxide and radiation detectors; and contact closures for security systems. Thus, the present network appliance provides a point of system integration.

To provide further enhanced I/O capability, the I/O circuitry can be compatible with local control protocols such as the X10 and CEbus protocols which are recognized standards for controlling line-powered devices such as lighting or appliances. Adding such and interface to the phone provides for network-based control of such devices.

Figure 33:
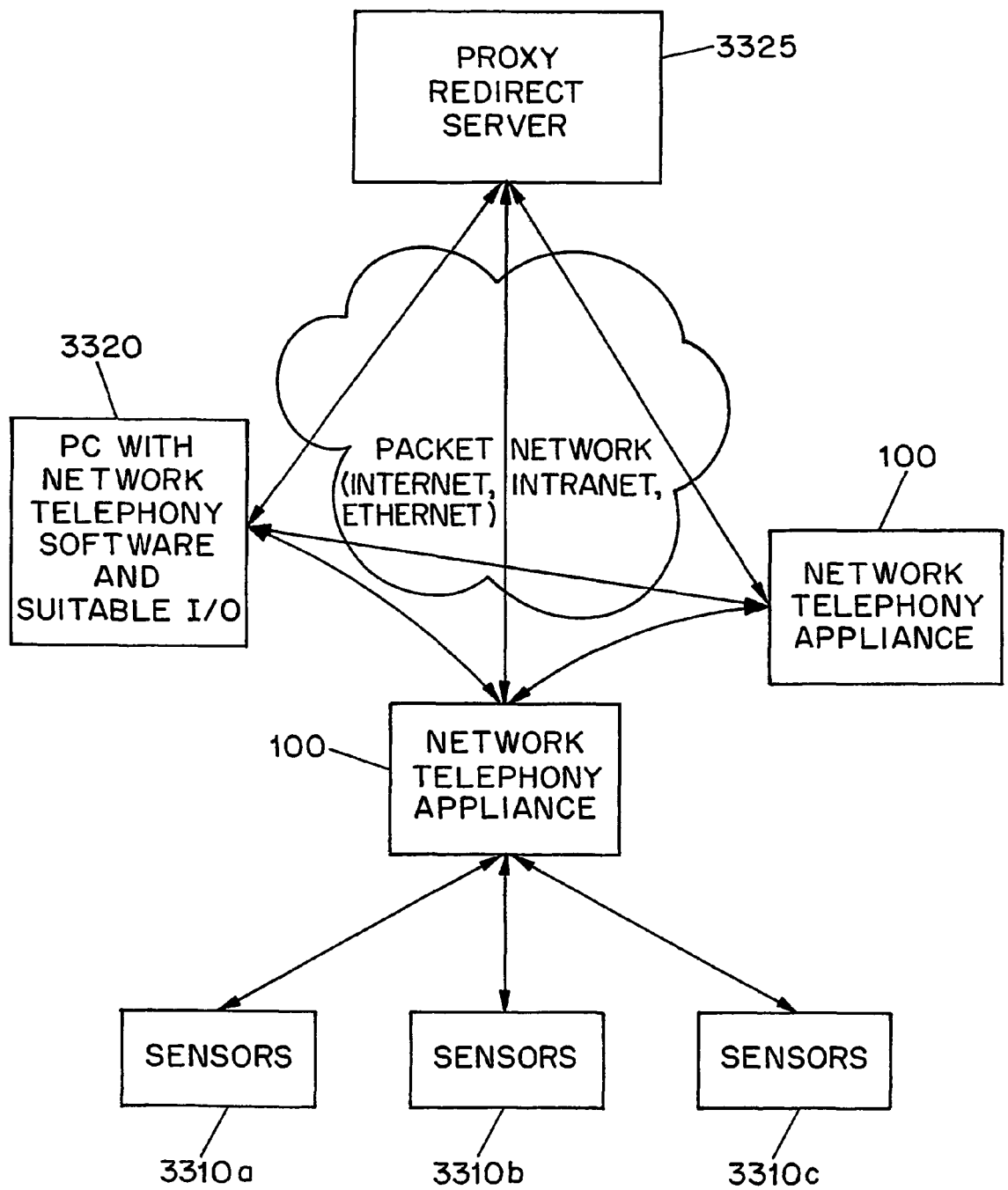
FIG. 33 is a block diagram which illustrates part of a packet data network telephony system including one or more network telephony appliances in accordance with the present invention.

FIG. 33 illustrates a system employing the present network appliance for establishing calls between two or more parties on the network. The system generally includes one or more stand alone network appliances 100, such as described above. In addition, the system can also include PC based telephony devices 3320, such as a network enabled PC operating suitable network telephony software which is protocol compliant with the network appliance 100. Each telephony endpoint can be referred to as a node and has a specific SIP address. By employing this specific address, any node acting as a calling party (client) can directly initiate a call session with any other node on the network (server).

The system preferably also includes a redirect server 3325 which can be accessed by the various nodes on the network to provide enhanced services, such as a directory service, call forwarding, call branching, call messaging and the like. For example, a calling party wishing to initiate a call to JOHN SMITH can enter the SIP address for that person if it is known, such as sip:john.smith@work.com. If, on the other hand, the calling party does not know the SIP address of the party, the calling party can contact the redirect server 3325 with a request to begin a session with JOHN SMITH. The redirect server includes databases with registration information for various parties and can return the SIP address to the calling party or forward the call request to the proper SIP address. In addition, the called party may have multiple sip addresses such as john.smith@home, john.smith@office, john.smith@lab and the like. The redirect server can provide a session initiation signal to each of these addresses and establish a connection between the calling party and the first contacted node that responds to the initiation request. Similarly, parties can periodically register with the redirect server to indicate the current SIP address where they can be contacted (call forwarding feature).

The network appliance 3305 can be configured to interface to one or more sensors 3310. Signals from the sensors are received by the network appliance 3305 and can be sent along the network to a desired network node. The signals from the sensors can be detected periodically by a timer in the network appliance and sent to a SIP address stored in memory. Alternatively, the sensor signals can be measured by the network appliance 100 based on a command received from another node (polled by a remote network node) or can be measured based on a received interrupt signal indicating a change of state of the sensor (interrupt driven). For example, the network appliance 100 can be used as a security system communication device which reports the status of various security sensor points to a central monitoring station. In such a case, the appliance can periodically check the status of the connected sensors, such as door sensors, fire sensors, passive infrared detectors and the like, and report to a central station node the current status. In the event of a status change that would indicate an alarm condition, the appliance 100 could generate a call session with the central station and report this condition as well. Of course, the same appliance which is acting as an alarm communicator can also provide fill telephony functions as well. In addition, while a simple security application was described, it will also be appreciated that various other data collection and control applications generally known as SCADA (site control and data acquisition), can be implemented using the present network appliance 100.

To maintain lifeline service during power outages, the network appliance of the present invention can be equipped with a rechargeable battery, possibly integrated into a wall transformer.

As many locations are currently equipped with only one Ethernet interface, the network appliance of the present invention should provide a two-port Ethernet hub, with an external RJ-45 interface. This provides for simultaneous operation of both the telephony device and network enabled computer.

In addition to audio data, the present network appliance can also receive and transport video data. For example, a video input interface, either analog or through a USB (Universal Serial Bus) can be operatively coupled to DSP 122 to implement this feature.

The present network appliance 100 can also be coupled to a suitable wireless Ethernet interface to allow the equivalent of a cordless phone. For example, Bluetooth or IEEE 802.11 compatable wireless modules can be incorporated into the appliance to provide wireless data exchange with other devices. Such a module can be incorporated, for example, as part of the Ethernet Control Subsystem 110 to provide wireless connectivity to the data network.

The following protocols can be added to the present network appliance 100 to provide expanded functionality: DHCP and RARP for automatic assignment of IP addresses; IGMP for subscribing to multicast groups; RTSP for retrieving voice mail and distinctive ringing signals; SAP for listening to announcements of multicast "radio" events; and DNS for name resolution (subject to available program memory space).

In addition to basic telephony operations, the present network appliance can also provide high level telephony functions. For example a "Do not disturb" feature can be provided that automatically forwards calls for a given duration to a designated location as specified by a SIP address input by the user. Each time the feature is selected, such as by depressing a button on the user interface, the time increases by a predetermined interval (e.g., 15 minutes).

"Call logging" can also be provided wherein the SIP address and related information regarding incoming calls is logged by storing the information in memory, with the ability to call back the calling party by scrolling through the list and selecting the SIP address of the caller from the log by user interaction via the user interface subsystem 160.

The network appliance can also include an "Automatic address book." Through user input or via a server connected on the network, the network appliance can acquire a speed dial list or a list of names stored in its local memory which a user can scroll through (using the SIP "multiple choices" response).

An "Interface to voice mail system" feature can display all unanswered calls that have come in, including the time of call, the caller, the subject and urgency of the call and whether the caller left voice mail. Calls can be ordered chronologically or by urgency. The call display preferably features five soft buttons: to delete the entry, to move forward and back through the list, to return the call and to retrieve the message.

"Distinctive ringing" is a feature wherein the appliance 100 is programmed to announce certain callers by a distinct sound clip, such as a distinctive ring, melody or the name of the caller. In this case a small database associates a caller, or a class of callers (e.g., friend, customer, urgent) to a particular selected ring response. The sound clip is played either from memory or retrieved from a server;

"Call forwarding" is a further feature which can be implemented in the appliance 100. Typically, calls are forwarded by the proxy redirect server. However, the network appliance 100 can also perform simple forwarding itself, as described above for the "do not disturb" button. The redirection may take the form of calling the phone from another phone with a REGISTER command, to implement follow-me calls. Also, automatic forwarding of calls from certain domains or during certain hours is readily implemented without use of a redirect server.

"Intercom" mode is a feature where incoming calls are "picked up" automatically, with the microphone disabled until a push-to-talk button is pressed or the receiver is lifted. This can also be used as part of a security public address system.

"Baby monitoring" features allow the network appliance to act as a remote audio monitoring device. For example, on receipt of an incoming call the network appliance 100 is activated with the speaker disabled but with the microphone automatically enabled such that the calling party can listen to the environment where the called appliance is located. This feature can be selectively engaged, such as by a predetermined code or caller identity;

An "Internet radio" feature allows the network appliance 100 to automatically play radio stations supplied by a local RTP multicast server or other streaming media source when a call is not being received or initiated. The appliance 100 can listen for SAP announcements and can display the station list on the display, with soft buttons. Any incoming phone call interrupts the current radio program.

The present network appliance can also maintain a "Callee list." If a previous call was successful, the callee's address is automatically entered into a portion of memory used as a local guide-dial list. When this party is to be dialed again, the callee can be selected by the upward or downward key from the callee's list. This is generally a FIFO type memory structure which automatically purges old entries and replaces them with more current entries; and "Redial," which allows single key dialing of either the last number dialed or the last callee.

In addition, "Speech processing enhancement," such as silence suppression, comfort noise generation, and echo cancellation can also be included in the present network appliance in a manner which is well known in the telephony art. Thus, a network-based telephone that is a stand-alone "network appliance" that allows the user to make phone calls within a local area network (LAN) or across the Internet has been disclosed. The core of the network appliance is a single digital signal processor (DSP) (a microcontroller optimized for processing audio and video data). It provides services that are a superset of those of a regular telephone, but connects and Ethernet data network instead of to the PSTN Public Switching Telephone Network). Since Ethernet running at 10 Mb/s can use the same twisted-pair wiring used for analog and digital phones, the Packet data network telephone does not require rewiring customer premises. A minimal system consists of two Packet data network telephones connected by an Ethernet cross-over cable. A multi-line basic PBX can be implemented consisting of any number of Packet data network telephone connected to an Ethernet hub or switch This "PBX" can scale to any number of phones, simply by adding Ethernet capacity and ports. The Packet data network telephone shares the Ethernet with other LAN services. In almost all cases, voice traffic will be a small fraction of the network capacity. (A single voice call consumes about 16 kb/s of the 10 Mb/s capacity.) The Packet data network telephone offers voice communications, implementing the customary features of PBXs. However, the present network appliance may use a server located in the LAN or the Internet to provide additional functionality, such as user location and directory services, call forwarding, voice mail, attendant services.

A PBX based on the current network appliance can reach traditional phones through an Internet Telephony Gateway (ITG). Such a gateway connects to the PSTN using either analog lines, ISDN basic or primary rate interfaces or digital trunks (such as T1/E1). ITGs have recently been introduced as commercial products, with capacities of one to about 240 lines.

Figure 34:
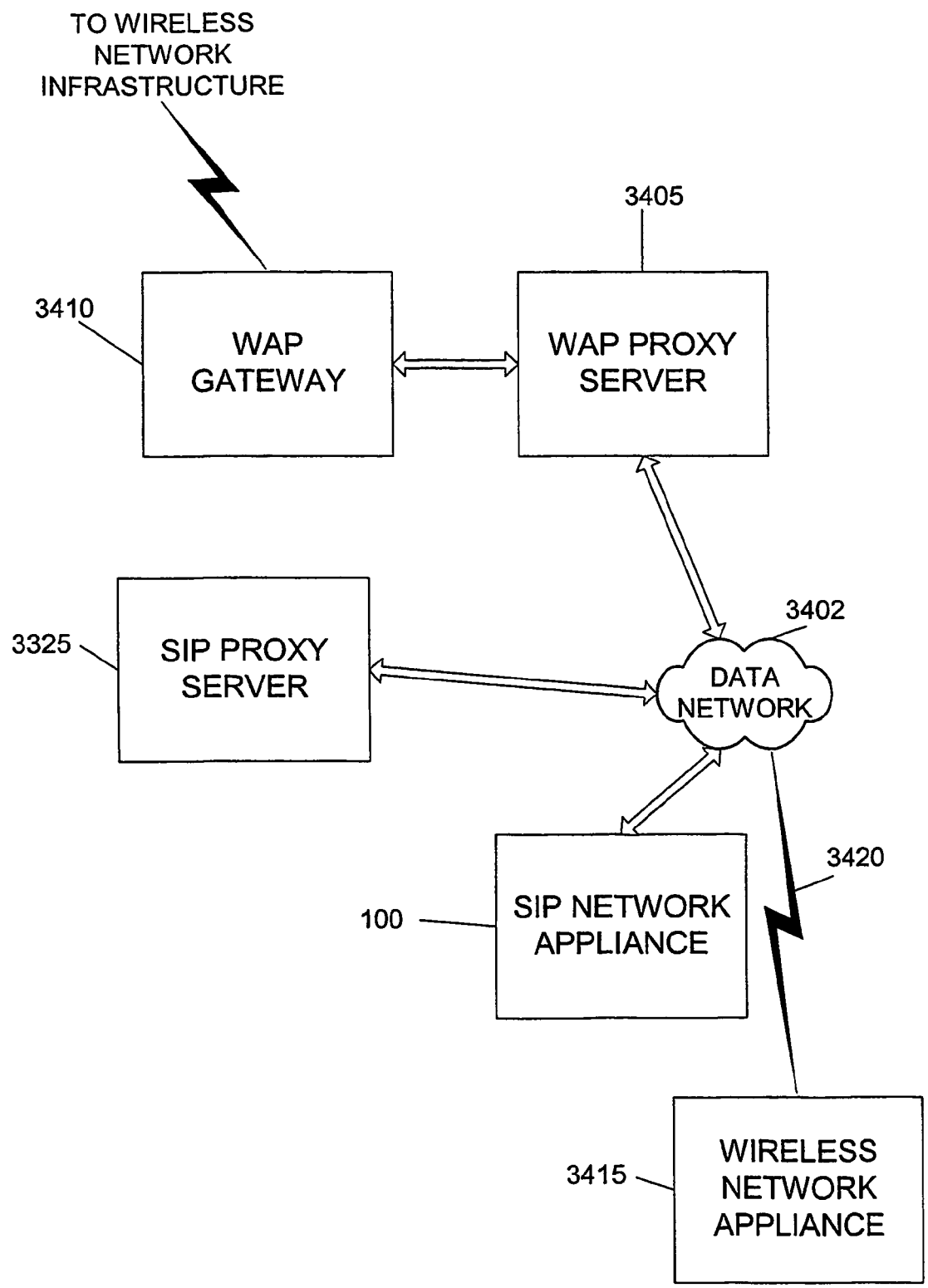
FIG. 34 is a block diagram illustrating a network architecture supporting wireless communications protocols in a telephony system having at least one network appliance.

FIG. 34 is a block diagram of a system architecture for enabling wireless services in an internet telephony network. The system includes one or more network telephony appliances 100 which preferably operate in accordance with the SIP protocol. The SIP network appliances 100 are coupled to a data network 3402, such as an Ethernet based intranet, and generally operate in conjunction with one or more SIP proxy servers 3325 which can be used as redirect servers and can provide enhanced functionality. A wireless services proxy server 3405 and a wireless services gateway 3410 are also provided. The wireless services proxy server 3405 can be formed as part of the wireless services gateway 3410 or can be separate operational units as shown. When formed as separate units, the wireless services proxy server 3405 can be coupled to and in communication with the wireless services gateway 3410 via a dedicated connection as shown or via the data network 3402. In one embodiment, the wireless proxy server 3405 and the wireless services gateway 3410 are compatable with the WAP protocol. However, other wireless services can also be supported to provide 2G, 2.5G and 3G enhanced telephony services.

It is further contemplated that one or more wireless network appliances 3415 can be deployed in the system. As described above, this functionality can be provided by including a wireless module, such as a Bluetooth or IEEE 802.11 compatable module in the network appliance 100 and by having a suitable wireless network interface as part of the data network 3402. This is illustrated by wireless communication link 3420.

The WAP gateway 3410 is a computer system which supports communications with a wireless network infrastructure and communicates messages to and from the wireless network infrastructure in response to the WAP proxy server 3405. The WAP proxy server is generally interposed between the WAP gateway 3410 and the network appliance 100. The WAP proxy server 3405 receives messages in accordance with the WAP protocol from the WAP gateway 3410 and translates these messages into a form that can be readily displayed on the network appliance 100. The WAP proxy server 3405 translates the WAP protocol stack, including WML and WMLscript, to a simple terminal interface signal which is compatable with the display properties of the network appliance, such as the LCD display described above. Similarly, each display and keystroke operation from the network appliance 100 can be transmitted to the WAP proxy server 3405 as a SIP Message request, where it is translated into a suitably formatted message for the corresponding wireless protocol, such as WAP.

When a WAP proxy server is used, the network appliance need not be a WAP compatable device, as the WAP proxy server 3405 is acting as a handler for the WAP protocol. This allows the network appliance to operate without being burdened by the processing related to the WAP protocol. However, if desired, as illustrated in FIG. 3, the software stack architecture for the network appliance can include a wireless protocol layer 99.

During normal operation in the architecture of FIG. 34, the network appliance 100 will transit SIP MESSAGE messages to a designated SIP proxy server 3325 which routes the messages to the WAP proxy server 3405. However, the network appliance 100 can exchange SIP MESSAGE messages directly with the WAP proxy server 3405, if preferred.

The present system provides an environment where SIP provides the enabling protocol for network appliances to perform numerous advanced wireless applications, such as second generation (2G) telephony services, extended second generation (2.5G) telephony services and third generation (3G) wireless applications.

One such feature is the delivery of content to a network appliance 100 when the system detects that the appliance is in an idle mode, such as when no call is in progress. The content, such as an advertisement provided by a content sponsor, can be delivered to the network appliance, and if the feature is enabled by the user, the content can be displayed on the display of the network appliance 100. The content can include a URL, SIP address or the like which can be displayed and is selectable by the user of the network appliance in order to automatically link to the content sponsor. The link can be a voice call initiated by the user, a SMS message, or a link to an Internet location specified by the URL delivered in the content. In one embodiment, the received content can be configured to automatically reconfigure a "soft key" on the network appliance. In this case, by depressing the programmed button on the appliance, the link will be initiated.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A communication system comprising:
 a network appliance device coupled to a network, the device comprising software for detecting incoming calls and initiating call sessions in accordance with a signaling protocol;
 a communication gateway coupled to the network, the communication gateway providing for communications between the network appliance and devices outside the network in accordance with a wireless communications protocol; and
 a wireless communication proxy server coupled to the network for translating messages between the signaling protocol and the wireless communication protocol;
 wherein the network appliance device comprises a display, and the network appliance device receives messages translated by the wireless communication proxy that relate to advertising content for output to the display.

2. The system of claim 1 wherein the signaling protocol is Session Initiation Protocol (SW) and the wireless communication protocol is Wireless Application Protocol (WAP).

3. The system of claim 2 further comprising at least one SIP proxy server coupled to the network for exchanging SIP messages with the network appliance device and with the wireless communication proxy server.

4. The system of claim 2 wherein the network appliance device and the wireless communication proxy server exchange SIP messages directly.

5. The system of claim 2 wherein a key stroke at the network appliance device is provided to the wireless communication proxy server as a single SIP request.

6. The system of claim 1 wherein the network appliance device receives messages translated by the wireless communication proxy server that relate to the advertising content for the display when no call is in progress.

7. The system of claim 6 wherein the network appliance device is configurable to allow a user to select the content displayed when no call is in progress.

8. The system of claim 1 wherein the signaling protocol is Session Initiation Protocol (STP).

9. The system of claim 1 wherein the wireless communication protocol is Wireless Application Protocol (WAP).

10. The system of claim 1 wherein the communication gateway and the wireless communications proxy server are an integrated system.

11. A method of communicating with a network appliance device in a network, comprising:
 at the network appliance device, detecting incoming calls and initiating call sessions in accordance with a first protocol and receiving messages translated by a communication proxy that relate to advertising content for display at the device; and
 using the communication proxy, to translate the messages between the first protocol and a second protocol to allow the network appliance device to communicate in accordance with the second protocol.

12. The method of claim 11 wherein the first protocol is Session Initiation Protocol (SIP) and the second protocol is Wireless Application Protocol (WAP).

13. The method of claim 12 further comprising using one or more SIP servers coupled to the network for exchanging SIP messages with the network appliance device and with the communication proxy.

14. The method of claim 12 further comprising directly exchanging SIP messages between the network appliance device and the communication proxy.

15. The method of claim 11 wherein the messages that relate to the adverstising content for display at the device are received when no call is in progress.

16. The method of claim 15 further comprising, at the network appliance device, allowing a user to configure the device to select the advertising content displayed when no call is in progress.

17. The method of claim 11 wherein the first protocol is Session Initiation Protocol (SIP).

18. The method of claim 11 wherein the second protocol is Wireless Application Protocol (WAP).

19. A communication system comprising:
 a network appliance device coupled to a network, the device comprising software for detecting incoming calls and initiating call sessions in accordance with Session Initiation Protocol (SIP);
 at least one SIP server coupled to the network for exchanging SIP messages with the network appliance device; and
 a communication gateway coupled to the network for allowing the network appliance device to communicate outside the network in accordance with a wireless communication protocol;
 wherein the network appliance device comprises a display, and the network appliance device receives messages translated by the communication gateway that relate to advertising content for the display.

20. The system of claim 19 wherein wireless communication protocol is the Wireless Application Protocol (WAP).

* * * * *